(12) United States Patent
Buob et al.

(10) Patent No.: US 12,267,037 B2
(45) Date of Patent: Apr. 1, 2025

(54) HALF-STEP MOTOR DRIVER

(71) Applicant: Siemens Schweiz AG, Zürich (CH)

(72) Inventors: Christoph Buob, Lucerne (CH); Richard Bork, Lucerne (CH); Norbert Glensk, Lindlar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 170 days.

(21) Appl. No.: 17/967,022

(22) Filed: Oct. 17, 2022

(65) Prior Publication Data

US 2023/0198432 A1   Jun. 22, 2023

(30) Foreign Application Priority Data

Nov. 15, 2021   (EP) .................................... 21208266

(51) Int. Cl.
   *H02P 8/22*        (2006.01)
   *H02K 37/00*       (2006.01)
   *H02P 5/505*       (2016.01)

(52) U.S. Cl.
   CPC ............... *H02P 8/22* (2013.01); *H02P 5/505* (2016.02); *H02K 37/00* (2013.01)

(58) Field of Classification Search
   CPC ... H02P 8/22; H02P 8/40; H02P 5/505; H02K 37/00; F16K 31/046
   See application file for complete search history.

(56) References Cited

U.S. PATENT DOCUMENTS

| | | | |
|---|---|---|---|
| 3,787,727 A | 1/1974 | McSparran | 318/696 |
| 2005/0001484 A1 | 1/2005 | Mohr | 307/24 |
| 2005/0225270 A1* | 10/2005 | Schnetzka | H02M 5/4585 318/66 |
| 2011/0024980 A1* | 2/2011 | Sekiya | B65H 3/0669 318/696 |

FOREIGN PATENT DOCUMENTS

JP  6 537 731  7/2019 ............. H02P 25/22

* cited by examiner

*Primary Examiner* — Said Bouziane
(74) *Attorney, Agent, or Firm* — Slayden Grubert Beard PLLC

(57) ABSTRACT

An HVAC system comprising: an appliance; a control assembly; a first motor; and a second motor. The control assembly: applies a electric signal to the first terminal of the first winding of the first motor for a number of intervals of time; afterwards, apply a second signal to the first terminal of the first winding; apply the first electric signal to the first terminal of the second winding for a second number of regular intervals of time; and after the application of the first electric signal to the first terminal of the second winding, apply the second electric signal to the first terminal of the second winding of the second motor; wherein the first number of regular intervals of time and the second number of regular intervals of time differ by one regular interval of time.

15 Claims, 6 Drawing Sheets

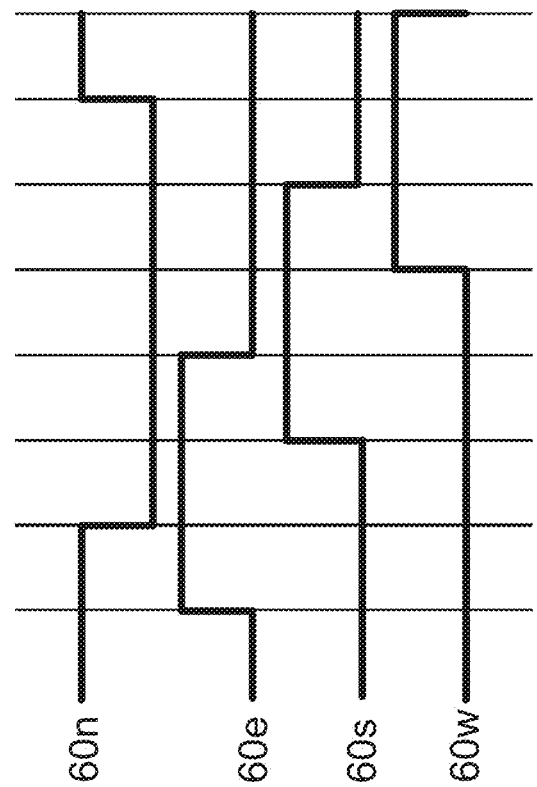
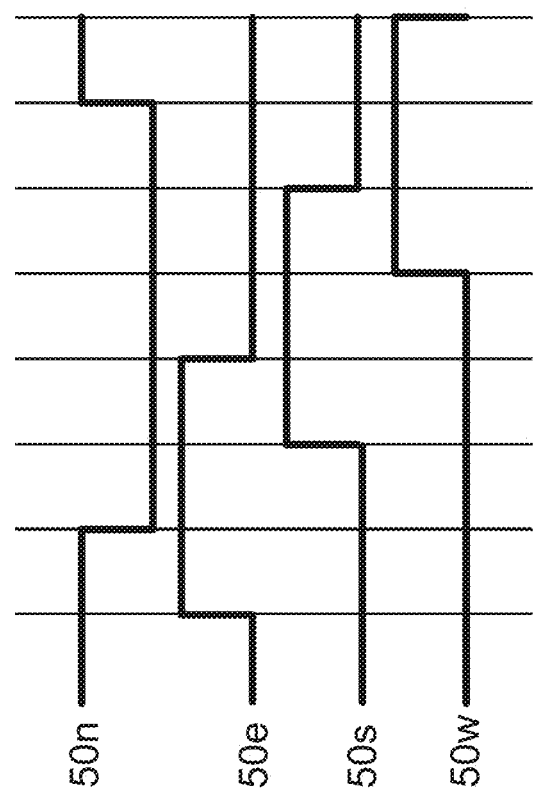
FIG 5

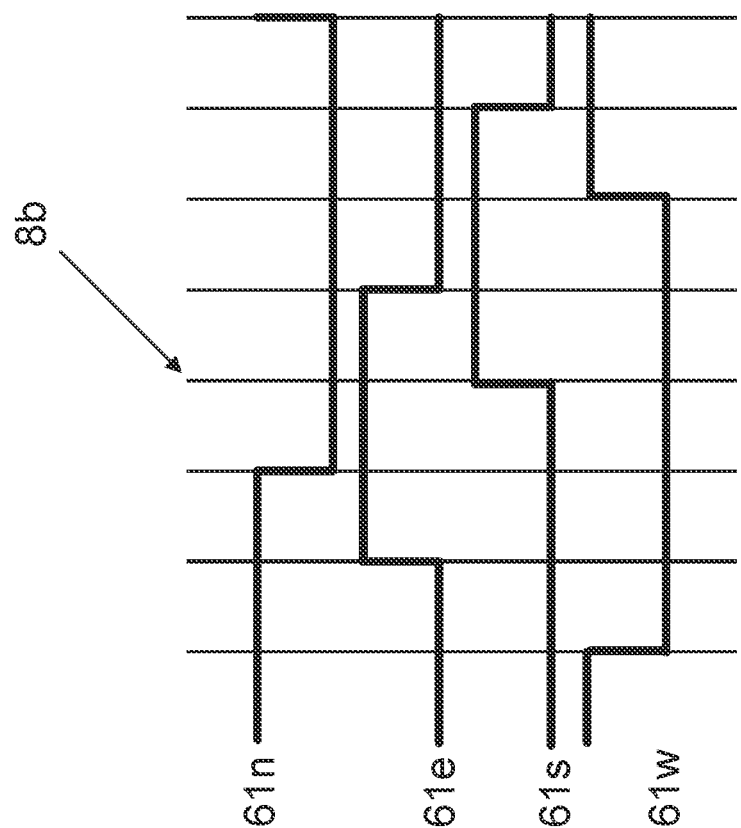
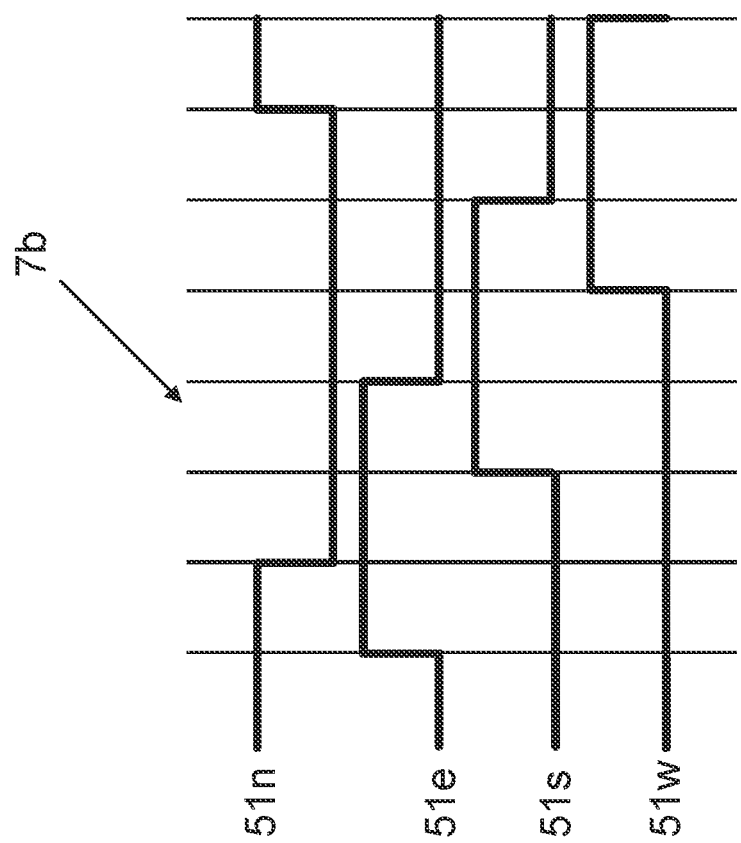
FIG 6

HALF-STEP MOTOR DRIVER

CROSS-REFERENCE TO RELATED APPLICATIONS

This application claims priority to EP Application Serial No. 21208266.3 filed Nov. 15, 2021, the contents of which are hereby incorporated by reference in their entirety.

TECHNICAL FIELD

The present disclosure deals with HVAC systems. Various embodiments of the teachings herein may include systems and/or methods for the control of systems for heating and/or ventilation and/or air-conditioning (HVAC).

BACKGROUND

Installations for HVAC are commonly made up of a plurality of circuits. Each circuit comprises one or more terminal units to provide heating and/or cooling to various parts of a building. Terminal units can be heating devices and/or cooling devices. A terminal unit of a domestic heating system can be a heat exchanger such as a radiator.

HVAC installations can also comprise one or more refrigerant circuits. These refrigerant circuits are made up of compressors, evaporators, expansion valves, and condensers. A compressor, an evaporator, an expansion valve such as an electronic expansion valve, and a condenser connect in series to form a refrigerant circuit. The circuit can provide additional sensors such as temperature sensors, pressure sensors, and power meters to monitor and control operation of the circuit.

Stepper motors are often employed to control flow through such circuits. More specifically, stepper motors set the positions of valves within such circuits, thereby controlling flow through the valves and ultimately through the circuits. A driver circuit connected to a controller can be used to supply such stepper motors with electric currents.

A plethora of refrigerants such as
ammonia,
1,1,1,2-tetrafluoroethane (R-134a),
difluoromethane (R-32)
can circulate within the refrigerant circuits of a system for heating and/or ventilation and/or air-conditioning. These refrigerants differ in their global warming potentials. Whilst ammonia is known to have zero or limited global warming potential, the global warming potential of 1,1,1,2-tetrafluoroethane is substantial. The global warming potential of 1,1,1,2-tetrafluoroethane compared to carbon dioxide is estimated to be or exceed 1430. That is, single a kilogram of 1,1,1,2-tetrafluoroethane exceeds the global warming potential of 1.4 tons of carbon dioxide. In other words, a spill of a single kilogram of 1,1,1,2-tetrafluoroethane (R-134a) has roughly the same 5,500 environmental impact as a passenger vehicle driving kilometers.

Compared to 1,1,1,2-tetrafluoroethane, the global warming potential of difluoromethane (R-32) is limited. The use of difluoromethane (R-32) refrigerant circuits does, however, require larger mechanical forces when switching valves within these circuits. Consequently, more powerful stepper motors are employed to accommodate the increased mechanical forces and/or the increase in torque.

More powerful stepper motors result in larger electric currents to be supplied to the stepper motors. Where these electric currents are supplied by a driver circuit, a driver circuit with a higher rating will be needed, too. Driver circuits are, however, difficult to upgrade or replace. The driver circuits may be permanently built into a system for heating and/or ventilation and/or air-conditioning. Also, an upgrade or a replacement of such circuits may involve changes in the design of an entire system for controlling heating and/or ventilation and/or air-conditioning.

A patent U.S. Pat. No. 3,787,727A deals with stepper motor control. Table 1 of U.S. Pat. No. 3,787,727A shows that more than one winding of a stator can be energized at a time. To that end, a circuit can energize two output conductors N, E, S, W at a time. In a first step, only one conductor N is energized. In a second step, an additional output conductor E is energized. That is, two output conductors N and E are energized in the second step. That way, the amount of torque applied by a stepper motor is controlled. More specifically, the amount of torque applied during start-up and stop is controlled. Consequently, issues due to over-shoot or hunting are mitigated.

SUMMARY

The instant disclosure deals with a system for heating and/or ventilation and/or air-conditioning, the system controlling two or more (stepper) motors. The (stepper) motors are controlled such that only a limited number of stator windings of these motors are energized at a time. By limiting numbers of energized stator windings, the peak currents supplied by driver circuit are limited, too. For example, some embodiments of the teachings herein include a system (1) for heating and/or ventilation and/or air-conditioning, the system (1) comprising an appliance (2a-2d), a control assembly (3a-3d, 4a-4d) in operative communication with the appliance (2a-2d), a first motor (5a-5d) in operative communication with the control assembly (3a-3d, 4a-4d), and a second motor (6a-6d) in operative communication with the control assembly (3a-3d, 4a-4d), wherein the first motor (5a-5d) acts on a coolant and/or heating medium flowing through the system (1) and has a first winding having a first terminal and a second terminal; wherein the second motor (6a-6d) acts on a coolant and/or heating medium flowing through the system (1) and has a first winding having a first terminal and a second terminal; wherein the first winding of the first motor (5a-5d) is different from the first winding of the second motor (6a-6d); the control assembly (3a-3d, 4a-4d) being configured to: apply a first electric signal selected from an electric high signal and an electric low signal to the first terminal of the first winding of the first motor (5a-5d) for a first number of regular intervals of time; after the application of the first electric signal to the first terminal of the first winding of the first motor (5a-5d), apply a second electric signal selected from an electric low signal and an electric high signal to the first terminal of the first winding of the first motor (5a-5d), the second electric signal being different from the first electric signal; apply the first electric signal to the first terminal of the first winding of the second motor (6a-6d) for a second number of regular intervals of time; and after the application of the first electric signal to the first terminal of the first winding of the second motor (6a-6d), apply the second electric signal to the first terminal of the first winding of the second motor (6a-6d); wherein the first number of regular intervals of time and the second number of regular intervals of time differ by one regular interval of time.

In some embodiments, the control assembly (3a-3d, 4a-4d) is configured to: after the application of the first electric signal to the first terminal of the first winding of the first motor (5a-5d), apply the second electric signal to the first terminal of the first winding of the first motor (5a-5d) for a third number of regular intervals of time; and after the application of the first electric signal to the first terminal of the first winding of the second motor (6a-6d), apply the second electric signal to the first terminal of the first winding of the second motor (6a-6d) for a fourth number of regular intervals of time.

In some embodiments, the control assembly (3a-3d, 4a-4d) is configured to: after the application of the second electric signal to the first terminal of the first winding of the first motor (5a-5d) for the third number of regular intervals of time, apply the first electric signal to the first terminal of the first winding of the first motor (5a-5d); and after the application of the second electric signal to the first terminal of the first winding of the second motor (6a-6d) for the fourth number of regular intervals of time, apply the first electric signal to the first terminal of the first winding of the second motor (6a-6d).

In some embodiments, the first motor (5a-5d) has a second winding having a first terminal and a second terminal; wherein the second motor (6a-6d) has a second winding having a first terminal and a second terminal; wherein the second winding of the first motor (5a-5d) is different from the second winding of the second motor (6a-6d); the control assembly (3a-3d, 4a-4d) is configured to: apply the second electric signal to the first terminal of the second winding of the first motor (5a-5d) for a fifth number of regular intervals of time; after the application of the second electric signal to the first terminal of the second winding of the first motor (5a-5d), apply the first electric signal to the first terminal of the second winding of the first motor (5a-5d); apply the second electric signal to the first terminal of the second winding of the second motor (6a-6d) for a sixth number of regular intervals of time; and after the application of the second electric signal to the first terminal of the second winding of the second motor (6a-6d), apply the first electric signal to the first terminal of the second winding of the second motor (6a-6d); wherein the fifth number of regular intervals of time and the sixth number of regular intervals of time differ by one regular interval of time.

In some embodiments, the control assembly (3a-3d, 4a-4d) is configured to: after the application of the second electric signal to the first terminal of the second winding of the first motor (5a-5d), apply the first electric signal to the first terminal of the second winding of the first motor (5a-5d) for a seventh number of regular intervals of time; and after the application of the second electric signal to the first terminal of the second winding of the second motor (6a-6d), apply the first electric signal to the first terminal of the second winding of the second motor (6a-6d) for an eighth number of regular intervals of time.

In some embodiments, the control assembly (3a-3d, 4a-4d) is configured to: after the application of the first electric signal to the first terminal of the second winding of the first motor (5a-5d) for the seventh number of regular intervals of time, apply the second electric signal to the first terminal of the second winding of the first motor (5a-5d); and after the application of the first electric signal to the first terminal of the second winding of the second motor (6a-6d) for the eighth number of regular intervals of time, apply the second electric signal to the first terminal of the second winding of the second motor (6a-6d).

In some embodiments, the first motor (5a-5d) has a third winding having a first terminal and a second terminal; wherein the second motor (6a-6d) has a third winding having a first terminal and a second terminal; wherein the third winding of the first motor (5a-5d) is different from the third winding of the second motor (6a6d); the control assembly (3a-3d, 4a-4d) being configured to: apply the second electric signal to the first terminal of the third winding of the first motor (5a-5d) for a ninth number of regular intervals of time; after the application of the second electric signal to the first terminal of the third winding of the first motor (5a-5d), apply the first electric signal to the first terminal of the third winding of the first motor (5a-5d); apply the second electric signal to the first terminal of the third winding of the second motor (6a-6d) for a tenth number of regular intervals of time; and after the application of the second electric signal to the first terminal of the third winding of the second motor (6a-6d), apply the first electric signal to the first terminal of the third winding of the second motor (6a-6d); wherein the ninth number of regular intervals of time and the tenth number of regular intervals of time differ by one regular interval of time.

In some embodiments, the control assembly (3a-3d, 4a-4d) is configured to: after the application of the second electric signal to the first terminal of the third winding of the first motor (5a-5d), apply the first electric signal to the first terminal of the third winding of the first motor (5a-5d) for an eleventh number of regular intervals of time; and after the application of the second electric signal to the first terminal of the third winding of the second motor (6a-6d), apply the first electric signal to the first terminal of the third winding of the second motor (6a-6d) for a twelfth number of regular intervals of time.

In some embodiments, the control assembly (3a-3d, 4a-4d) is configured to: after the application of the first electric signal to the first terminal of the third winding of the first motor (5a-5d) for the eleventh number of regular intervals of time, apply the second electric signal to the first terminal of the third winding of the first motor (5a-5d); and after the application of the first electric signal to the first terminal of the third winding of the second motor (6a-6d) for the twelfth number of regular intervals of time, apply the second electric signal to the first terminal of the third winding of the second motor (6a-6d).

In some embodiments, the first motor (5a-5d) has a fourth winding having a first terminal and a second terminal; wherein the second motor (6a-6d) has a fourth winding having a first terminal and a second terminal; wherein the fourth winding of the first motor (5a-5d) is different from the fourth winding of the second motor (6a-6d); the control assembly (3a-3d, 4a-4d) is configured to: apply the second electric signal to the first terminal of the fourth winding of the first motor (5a-5d) for a thirteenth number of regular intervals of time; after the application of the second electric signal to the first terminal of the fourth winding of the first motor (5a-5d), apply the first electric signal to the first terminal of the fourth winding of the first motor (5a-5d); apply the first electric signal to the first terminal of the fourth winding of the second motor (6a-6d) for a fourteenth number of regular intervals of time; and after the application of the first electric signal to the first terminal of the fourth winding of the second motor (6a-6d), apply the second electric signal to the first terminal of the fourth winding of the second motor (6a-6d); wherein the thirteenth number of regular intervals of time and the fourteenth number of regular intervals of time differ by at least one regular interval of time.

In some embodiments, the control assembly (3a-3d, 4a-4d) is configured to: after the application of the second electric signal to the first terminal of the fourth winding of the first motor (5a-5d), apply the first electric signal to the first terminal of the fourth winding of the first motor (5a-5d)

for a fifteenth number of regular intervals of time; and after the application of the first electric signal to the first terminal of the fourth winding of the second motor (6a-6d), apply the second electric signal to the first terminal of the fourth winding of the second motor (6a-6d) for a sixteenth number of regular intervals of time; wherein the fifteenth number of regular intervals of time and the sixteenth number of regular intervals of time differ by at least one regular interval of time.

In some embodiments, the control assembly (3a-3d, 4a-4d) is configured to: after the application of the first electric signal to the first terminal of the fourth winding of the first motor (5a-5d) for the fifteenth number of regular intervals of time, apply the second electric signal to the first terminal of the fourth winding of the first motor (5a-5d); and after the application of the second electric signal to the first terminal of the fourth winding of the second motor (6a-6d) for the sixteenth number of regular intervals of time, apply the first electric signal to the first terminal of the fourth winding of the second motor (6a-6d).

In some embodiments, the second terminal of the first winding of the first motor (5a-5d) electrically connects to the second terminal of the second winding of the first motor (5a-5d); wherein the second terminal of the second winding of the first motor (5a-5d) electrically connects to the second terminal of the third winding of the first motor (5a-5d); wherein the second terminal of the third winding of the first motor (5a-5d) electrically connects to the second terminal of the fourth winding of the first motor (5a-5d); wherein the second terminal of the first winding of the second motor (6a-6d) electrically connects to the second terminal of the second winding of the second motor (6a-6d); wherein the second terminal of the second winding of the second motor (6a-6d) electrically connects to the second terminal of the third winding of the second motor (6a-6d); and wherein the second terminal of the third winding of the second motor (6a-6d) electrically connects to the second terminal of the fourth winding of the second motor (6a-6d).

In some embodiments, the second terminal of the first winding of the first motor (5a-5d) electrically connects to the first terminal of the second winding of the first motor (5a-5d); wherein the second terminal of the second winding of the first motor (5a-5d) electrically connects to the first terminal of the third winding of the first motor (5a-5d); wherein the second terminal of the third winding of the first motor (5a-5d) electrically connects to the first terminal of the fourth winding of the first motor (5a-5d); wherein the second terminal of the fourth winding of the first motor (5a-5d) electrically connects to the first terminal of the first winding of the first motor (5a-5d); wherein the second terminal of the first winding of the second motor (6a-6d) electrically connects to the first terminal of the second winding of the second motor (6a-6d); wherein the second terminal of the second winding of the second motor (6a-6d) electrically connects to the first terminal of the third winding of the second motor (6a-6d); wherein the second terminal of the third winding of the second motor (6a-6d) electrically connects to the first terminal of the fourth winding of the second motor (6a-6d); and wherein the second terminal of the fourth winding of the second motor (6a-6d) electrically connects to the first terminal of the first winding of the second motor (6a-6d).

In some embodiments, the control assembly (3a-3d, 4a-4d) comprises a controller (3a-3d) and a driver circuit (4a-4d) having a plurality of amplifiers; wherein the controller (3a-3d) is in operative communication with the driver circuit (4a-4d) and in operative communication with the appliance (2a-2d); and wherein the driver circuit (4a-4d) is in operative communication with the first motor (5a-5d) and with the second motor (6a-6d).

BRIEF DESCRIPTION OF THE DRAWINGS

Various features are apparent to those skilled in the art based on the following detailed description of the disclosed non-limiting embodiments. The drawings that accompany the detailed description can be briefly described as follows:

FIG. 5 is a first set of diagrams of electric currents through the two stepper motors versus time; and FIG. 6 is a second set of diagrams of electric currents through the two stepper motors versus time.

DETAILED DESCRIPTION

In some embodiments of the teachings herein include a heating and/or ventilation and/or air-conditioning (HVAC) system with a controller and a driver circuit. The controller and the driver circuit form a control assembly. The control assembly feeds the windings of at least two motors such as at least two stepper motors. The windings of the first motor and of the second motor are fed in half-step mode. In some embodiments, not all the windings of the first motor such as the first stepper motor are energized at a time. In some embodiments, not all the windings of the second motor such as the first stepper motor are energized at a time. In some embodiments, not all the windings of the first and second motors are energized at the same time.

By limiting the number of windings energized at a time, the peak currents provided by the control assembly are limited. More specifically, the peak currents provided by the driver circuit are limited. The half-step excitation may be applied to a first winding of the first motor and to a first winding of a second motor. The half-step excitation may be applied to a first winding of a first stepper motor and to a first winding of a second stepper motor.

The first motor and the second motor can each have two windings. In some embodiments, the first stepper motor and the second stepper motor can each have two windings. The half-step excitation may be also applied to a second winding of the first motor and to a second winding of a second motor. The half-step excitation is ideally also applied to a second winding of a first stepper motor and to a second winding of a second stepper motor.

The first motor and the second motor can each have three windings. In some embodiments, the first stepper motor and the second stepper motor can each have three windings. The half-step excitation is may also be applied to a third winding of the first motor and to a third winding of a second motor. The half-step excitation is may also be applied to a third winding of a first stepper motor and to a third winding of a second stepper motor.

The first motor and the second motor can each have four windings. In some embodiments, the first stepper motor and the second stepper motor can each have four windings. The half-step excitation is also applied to a fourth winding of the first motor and to a fourth winding of a second motor. The half-step excitation is may also be applied to a fourth winding of a first stepper motor and to a fourth winding of a second stepper motor. The half-step excitation can be applied when the motors are star-connected. The half-step excitation can be applied when the stepper motors are star-connected. The half-step excitation can be applied when the motors are delta-connected or equivalent. The half-step excitation can be applied when the stepper motors are delta-connected or equivalent.

Figure 1:
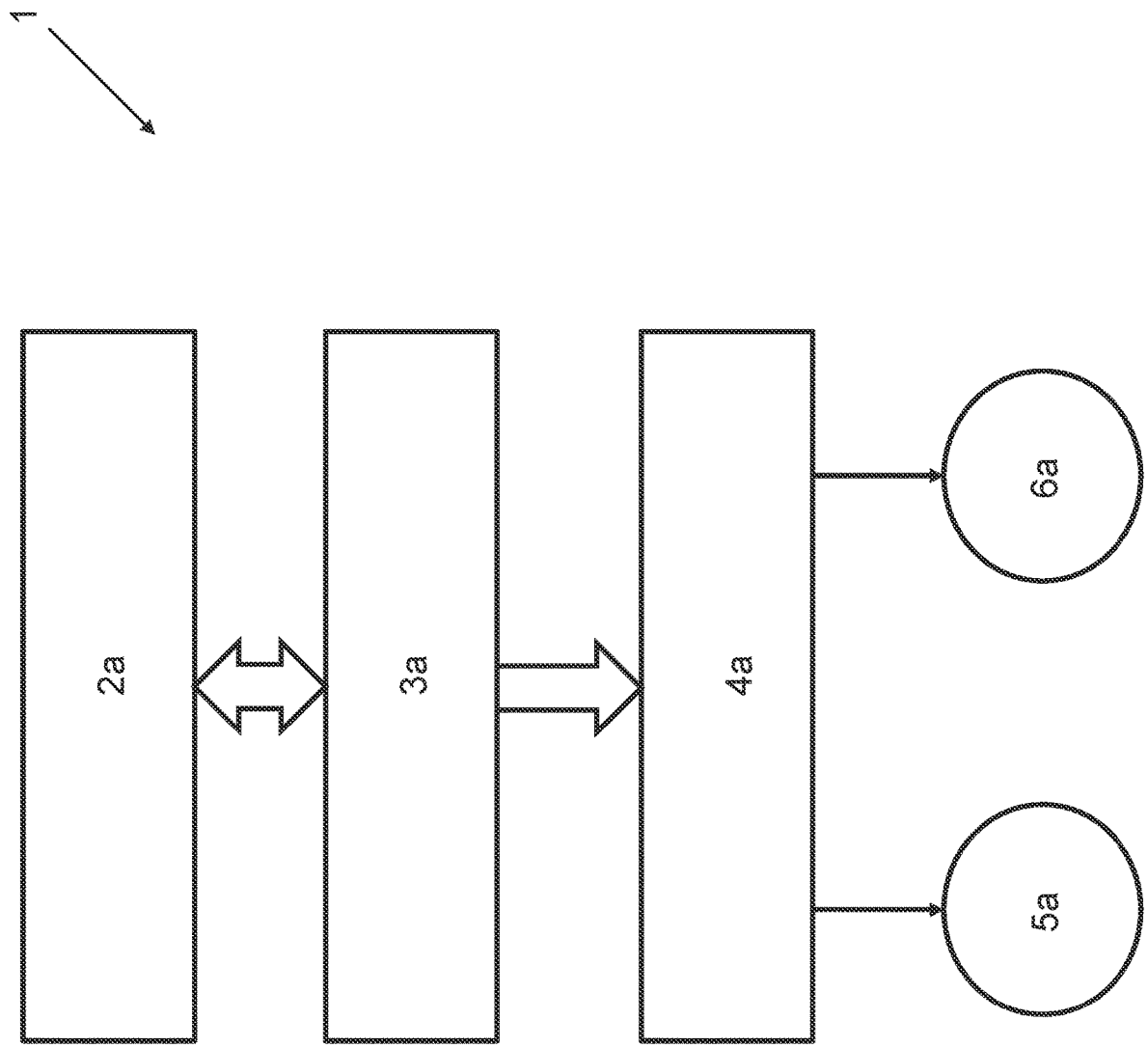
FIG. 1 schematically illustrates a system for heating and/or ventilation and/or air-conditioning (HVAC) having an appliance, a controller, a driver circuit, and two stepper motors incorporating teachings of the present disclosure.

FIG. 1 shows an HVAC system 1. The HVAC system 1 may comprise an installation for heating and/or ventilation and/or air-conditioning. In some embodiments, the system for heating and/or ventilation and/or air-conditioning 1 is an installation for heating and/or ventilation and/or air-conditioning. The system for heating and/or ventilation and/or air-conditioning 1 comprises an appliance 2a.

The appliance 2a can, by way of example, comprise at least one of:
  a compressor such as a compressor for a refrigerant circuit,
  a fan,
  an air conveyor,
  a fan coil unit,
  a valve such as a control valve,
  a pressure-independent control valve,
  an expansion valve such as an expansion valve for a refrigerant circuit,
  an electronic expansion valve such as an electronic expansion valve for a refrigerant circuit,
  a damper.

In some embodiments, the appliance 2a is selected from:
  a compressor such as a compressor for a refrigerant circuit,
  a fan,
  an air conveyor,
  a fan coil unit,
  a valve such as a control valve,
  a pressure-independent control valve,
  an expansion valve such as an expansion valve for a refrigerant circuit,
  an electronic expansion valve such as an electronic expansion valve for a refrigerant circuit,
  a damper.

The appliance 2a is in operative communication with a controller 3a. In some embodiments, the controller 3a comprises a microcontroller and/or a microprocessor. In some embodiments, the controller 3a is a microcontroller and/or is a microprocessor. In some embodiments, the controller 3a comprises a memory such as a non-volatile memory.

In some embodiments, the controller 3a is or comprises an inexpensive, low-power system-on-a-chip microcontroller having integrated wireless connectivity. In a special embodiment, the chip microcontroller has a memory not exceeding one mebibyte.

The connection between the appliance 2a and the controller 3a can be bidirectional. A bidirectional connection affords flexibility. The connection between the appliance 2a and the controller 3a can also be unidirectional. Communication from the appliance 2a to the controller 3a is facilitated by such a unidirectional connection. A unidirectional connection reduces complexity.

The communication between the appliance 2a and the controller 3a can be digital. In some embodiments, the communication between the appliance 2a and the controller 3a involves a digital communication bus. In some embodiments, the communication between the appliance 2a and the controller 3a involves a digital communication protocol such as a LON protocol and/or a KNX protocol.

The controller 3a is in operative communication with a driver circuit 4a. In some embodiments, the driver circuit 4a comprises one or more operational amplifiers. The one or more operational amplifiers afford amplification of signals originating from the controller 3a. That way, the driver circuit 4a produces signals that are suitable for any (stepper) motors connected to the driver circuit 4a. In some embodiments, the driver circuit 4a comprises one or more field-effect transistors. The one or more field-effect transistors afford amplification of signals originating from the controller 3a. That way, the driver circuit 4a produces signals that are suitable for any (stepper) motors connected to the driver circuit 4a. In some embodiments, the driver circuit 4a comprises one or more insulated-gate bipolar transistors. The one or more insulated-gate bipolar transistors afford amplification of signals originating from the controller 3a. That way, the driver circuit 4a produces signals that are suitable for any (stepper) motors connected to the driver circuit 4a.

The connection between the controller 3a and the driver circuit 4a can be unidirectional. Communication from the controller 3a to the driver circuit 4a is facilitated by such a unidirectional connection. A unidirectional connection reduces complexity. The connection between the controller 3a and the driver circuit 4a can also be bidirectional. A bidirectional connection affords flexibility. The communication between the controller 3a and the driver circuit 4a can be digital. In some embodiments, the communication between the controller 3a and the driver circuit 4a involves a digital communication bus. In some embodiments, the communication between the controller 3a and the driver circuit 4a involves a digital communication protocol.

In some embodiments, the controller 3a sends analog signals to the driver circuit 4a. The analog signals can, by way of non-limiting example, be signals between 0 Volt and 10 Volts. In some embodiments, the controller 3a comprises a digital-to-analog converter. The digital-to-analog converter provides conversion of digital signals from the controller 3a into analog signals. The analog signal can, by way of non-limiting example, be amplified by any operational amplifiers and/or field-effect transistors and/or insulated-gate bipolar transistors of the driver circuit 4a. The digital-to-analog converter is an integral part of the controller 3a. That is, the digital-to-analog converter and the controller 3a are arranged on the same system-on-a-chip. More specifically, the digital-to-analog converter and a microcontroller of the controller 3a are arranged on the same system-on-a-chip. In some embodiments, the digital-to-analog converter and the microprocessor of the controller 3a are arranged on the same system-on-a-chip.

In some embodiments, the controller 3a and the driver circuit 4a are arranged on the same circuit board.

In some embodiments, the controller 3a comprises a sigma-delta converter. The sigma-delta converter provides conversion of digital signals from the controller 3a into analog signals. The sigma-delta converter can be an integral part of the controller 3a. That is, the sigma-delta converter and the controller 3a are arranged on the same system-on-a-chip.

In some embodiments, the controller 3a comprises a balancer. The balancer is operable to manage loads and/or phase shifts of any motors such as stepper motors connected to the driver circuit 4a. More specifically, the balancer is operable to set (phases of) signals sent to the windings of a first motor. The balancer is may be operable to set (phases of) signals sent to the windings of a second motor. The balancer can shift the phases of signals sent to the windings of the second motor. This first phase shift takes place with respect to those phases of signals sent to the windings of the first motor. The balancer can also shift the phases of signals sent to the windings of the first motor. This second phase shift takes place with respect to those phases of signals sent to the windings of the second motor.

FIG. 1 depicts a single communication channel between the controller 3a and the driver circuit 4a. In some embodiments, the controller 3a provides a plurality of communication channels for communication with the driver circuit 4a. The number of communication channels provided by the controller 3a may be commensurate with the number of (stepper) motors connected to the driver circuit 4a. In an embodiment, the number of communication channels provided by the controller 3a matches the number of (stepper) motors connected to the driver circuit 4a. In another embodiment, the number of communication channels provided by the controller 3a matches the number of connected (stepper) motors multiplied with the number of windings per motor. That is, two motors each having four windings result in eight communication channels.

The plurality of communication channels as provided by the controller 3a can be analog communication channels. In some embodiments, all communication channels of the plurality of communication channels are analog communication channels. The plurality of communication channels as provided by the controller 3a can also be digital communication channels. In some embodiments, all communication channels of the plurality of communication channels are digital communication channels.

In some embodiments, at least one communication channel provided by the controller 3a corresponds to an output pin of the controller 3a. In some embodiments, each communication channel provided by the controller 3a corresponds to an output pin of the controller 3a. In some embodiments, each communication channel provided by the controller 3a comprises an output pin of the controller 3a. In some embodiments, each communication channel provided by the controller 3a is an output pin the of controller 3a.

In some embodiments, the driver circuit 4a can provide a plurality of communication channels for communication with the controller 3a. The number of communication channels provided by the driver circuit 4a may be commensurate with the number of (stepper) motors connected to the driver circuit 4a. In some embodiments, the number of communication channels provided by the driver circuit 4a matches the number of (stepper) motors connected to the driver circuit 4a. In some embodiments, the number of communication channels provided by the driver circuit 4a matches the number of connected (stepper) motors multiplied with the number of windings per motor. That is, two motors each having four windings result in eight communication channels.

The plurality of communication channels as provided by the driver circuit 4a can be analog communication channels. In some embodiments, all communication channels of the plurality of communication channels are analog communication channels. The plurality of communication channels as provided by the driver circuit 4a can also be digital communication channels. In some embodiments, all communication channels of the plurality of communication channels are digital communication channels.

In some embodiments, at least one communication channel provided by the driver circuit 4a corresponds to an input pin of the driver circuit 4a. In some embodiments, each communication channel provided by the driver circuit 4a corresponds to an input pin of the driver circuit 4a. In some embodiments, each communication channel provided by the driver circuit 4a comprises an input pin of the driver circuit 4a. In some embodiments, each communication channel provided by the driver circuit 4a is an input pin of the driver circuit 4a.

In some embodiments, the controller 3a provides the same number of communication channels as the driver circuit 4a. In some embodiments, the controller 3a provides the same types of analog or digital communication channels as the driver circuit 4a.

One or more of the communication channels between the controller 3a and the driver circuit 4a can be digital. The driver circuit 4a can thus comprise a digital-to-analog converter. The digital-to-analog converter provides conversion of digital signals originating from the controller 3a into analog signals. The analog signal can, by way of non-limiting example, be amplified to control one or more (stepper) motors.

The digital-to-analog converter can be an integral part of the driver circuit 4a. That is, the digital-to-analog converter and the driver circuit 4a are arranged on the same system-on-a-chip. More specifically, the digital-to-analog converter and a microcontroller of the driver circuit 4a are arranged on the same system-on-a-chip. In some embodiments, the digital-to-analog converter and a microprocessor of the driver circuit 4a are arranged on the same system-on-a-chip.

The driver circuit 4a can also comprise a balancer. The balancer is operable to manage loads and/or phase shifts of any motors such as (stepper) motors connected to the driver circuit 4a. More specifically, the balancer is operable to set (phases of) signals sent to the windings of a first and second motors. The balancer can shift the phases of signals sent to the windings of the second motor. This first phase shift takes place with respect to those phases of signals sent to the windings of the first motor. The balancer can also shift the phases of signals sent to the windings of the first motor. This second phase shift takes place with respect to those phases of signals sent to the windings of the second motor.

In some embodiments, the balancer is comprised by either the controller 3a or the driver circuit 4a. There is thus a single balancer arranged in a component selected from the controller 3a and the driver circuit 4a.

The driver circuit 4a can be an integral part of the controller 3a. That is, the driver circuit 4a and the controller 3a are arranged on the same system-on-a-chip. More specifically, the driver circuit 4a and a microcontroller of the controller 3a are arranged on the same system-on-a-chip. In some embodiments, the driver circuit 4a and a microprocessor of the controller 3a are arranged on the same system-on-a-chip.

FIG. 1 depicts a first motor 5a and a second motor 6a connected to the driver circuit 4a. In some embodiments, at least one of the motors 5a, 6a is a stepper motor. In some embodiments, the motors 5a, 6a are both stepper motors. In some embodiments, the first stepper motor 5a and the second stepper motor 6a are of the same type.

Two motors 5a and 6a are shown in FIG. 1. The present disclosure is not limited to embodiments having two motors 5a and 6a. The present disclosure is also not limited to embodiments having two motors 5a and 6a connected to the driver circuit 4a.

FIG. 1 shows a single communication channel between the driver circuit 4a and the first motor 5a. According to an aspect of the present disclosure, the driver circuit 4a provides a plurality of communication channels for communication with the first motor 5a. In an embodiment, the number of communication channels provided by the driver circuit 4a matches the number of windings first motor 5a. That is, a first motor 5a having four windings results in four communication channels.

The plurality of communication channels as provided by the driver circuit 4a can be analog communication channels. In some embodiments, all communication channels of the plurality of communication channels are analog communication channels. The plurality of communication channels as provided by the driver circuit 4a can also be digital communication channels. In some embodiments, all communication channels of the plurality of communication channels are digital communication channels.

In some embodiments, at least one communication channel provided by the driver circuit 4a corresponds to an output pin of the driver circuit 4a. The communication channel is provided by the driver circuit 4 for communication with the first motor 5a. In some embodiments, each communication channel provided by the driver circuit 4a corresponds to an output pin of the driver circuit 4a. In some embodiments, each communication channel provided by the driver circuit 4a comprises an output pin of the driver circuit 4a. In some embodiments, each communication channel provided by the driver circuit 4a is an output pin of the driver circuit 4a.

FIG. 1 also shows a single communication channel between the driver circuit 4a and the second motor 6a. In some embodiments, the driver circuit 4a provides a plurality of communication channels for communication with the second motor 6a. In some embodiments, the number of communication channels provided by the driver circuit 4a matches the number of windings second motor 6a. That is, a second motor 6a having four windings results in four communication channels.

The plurality of communication channels as provided by the driver circuit 4a can be analog communication channels. In some embodiments, all communication channels of the plurality of communication channels are analog communication channels. The plurality of communication channels as provided by the driver circuit 4a can also be digital communication channels. In some embodiments, all communication channels of the plurality of communication channels are digital communication channels.

In some embodiments, at least one communication channel provided by the driver circuit 4a corresponds to an output pin of the driver circuit 4a. The communication channel is provided by the driver circuit 4a for communication with the second motor 6a. In some embodiments, each communication channel provided by the driver circuit 4a corresponds to an output pin of the driver circuit 4a. In some embodiments, each communication channel provided by the driver circuit 4a comprises an output pin of the driver circuit 4a. In some embodiments, each communication channel provided by the driver circuit 4a is an output pin of the driver circuit 4a.

Figure 2:
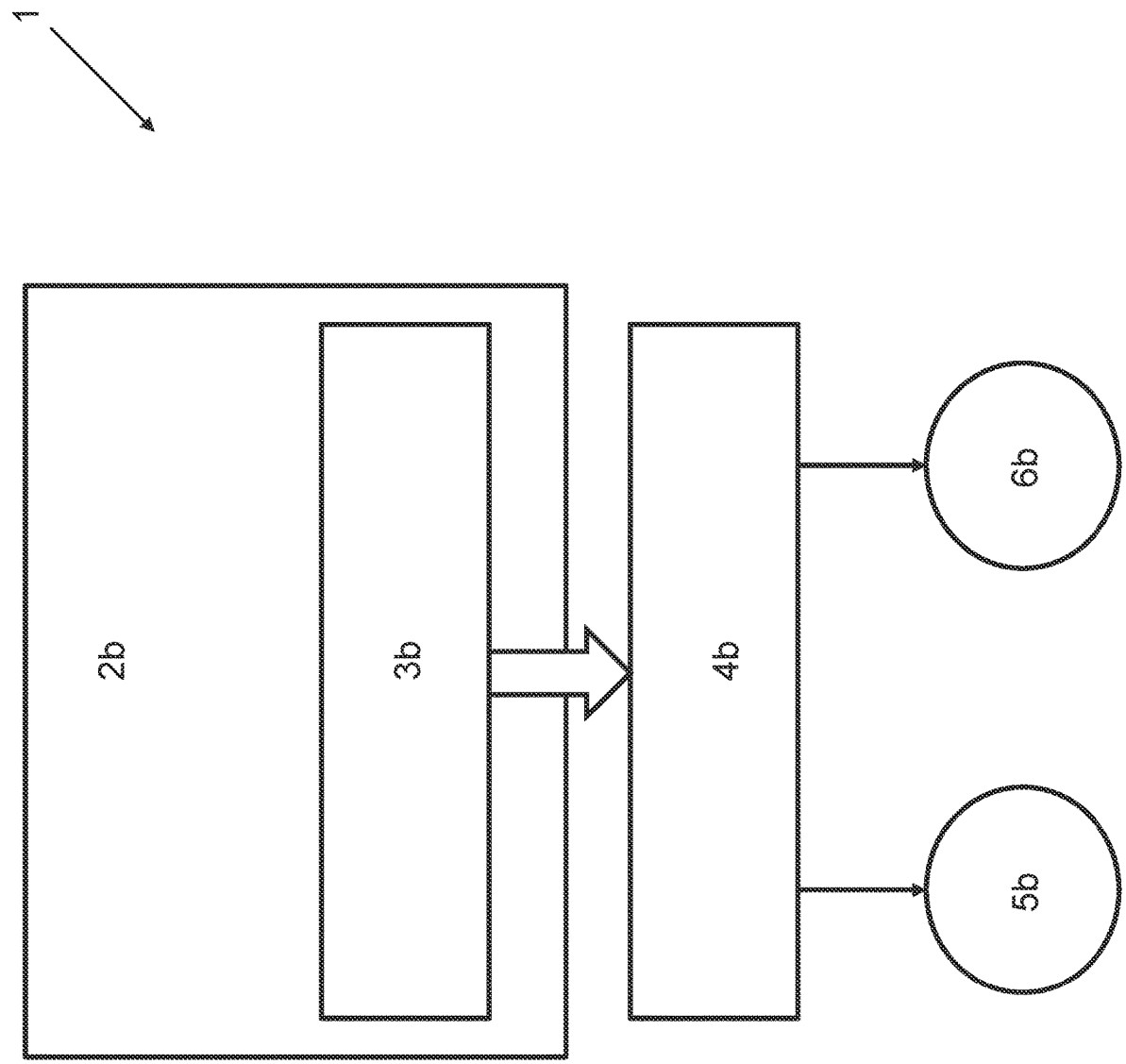
FIG. 2 schematically shows an HVAC system having a controller, a driver circuit, and two stepper motors, wherein the appliance comprises the controller incorporating teachings of the present disclosure.

Now turning to FIG. 2, the appliance 2b can comprise the controller 3b. FIG. 2 depicts a single communication channel between the appliance 2b and the driver circuit 4b. In some embodiments, the appliance 2b provides a plurality of communication channels for communication with the driver circuit 4b. The number of communication channels provided by the appliance 2b is advantageously commensurate with the number of (stepper) motors connected to the driver circuit 4b. In an embodiment, the number of communication channels provided by the appliance 2b matches the number of (stepper) motors connected to the driver circuit 4b. In some embodiments, the number of communication channels provided by the appliance 2b matches the number of connected (stepper) motors multiplied with the number of windings per motor. That is, two motors each having four windings results in eight communication channels.

The plurality of communication channels as provided by the appliance 2b can be analog communication channels. In some embodiments, all communication channels of the plurality of communication channels are analog communication channels. The plurality of communication channels as provided by the appliance 2b can also be digital communication channels. In some embodiments, all communication channels of the plurality of communication channels are digital communication channels.

The communication between the appliance 2b and the driver circuit 4b can be digital. In some embodiments, the communication between the appliance 2b and the driver circuit 4b involves a digital communication bus. In some embodiments, the communication between the appliance 2b and the driver circuit 4b involves a digital communication protocol.

In some embodiments, at least one communication channel provided by the appliance 2b corresponds to an output pin of the appliance 2b. In some embodiments, each communication channel provided by the appliance 2b corresponds to an output pin of the appliance 2b. In some embodiments, each communication channel provided by the appliance 2b comprises an output pin of the appliance 2b. In some embodiments, each communication channel provided by the appliance 2b is an output pin of the appliance 2b.

In some embodiments, the first motor 5b connected to the driver circuit 4b comprises a first stepper motor. In some embodiments, the first motor 5b connected to the driver circuit 4b ideally is a first stepper motor. In some embodiments, the second motor 6b connected to the driver circuit 4b comprises a second stepper motor. In some embodiments, the second motor 6b connected to the driver circuit 4b is a second stepper motor.

Figure 3:
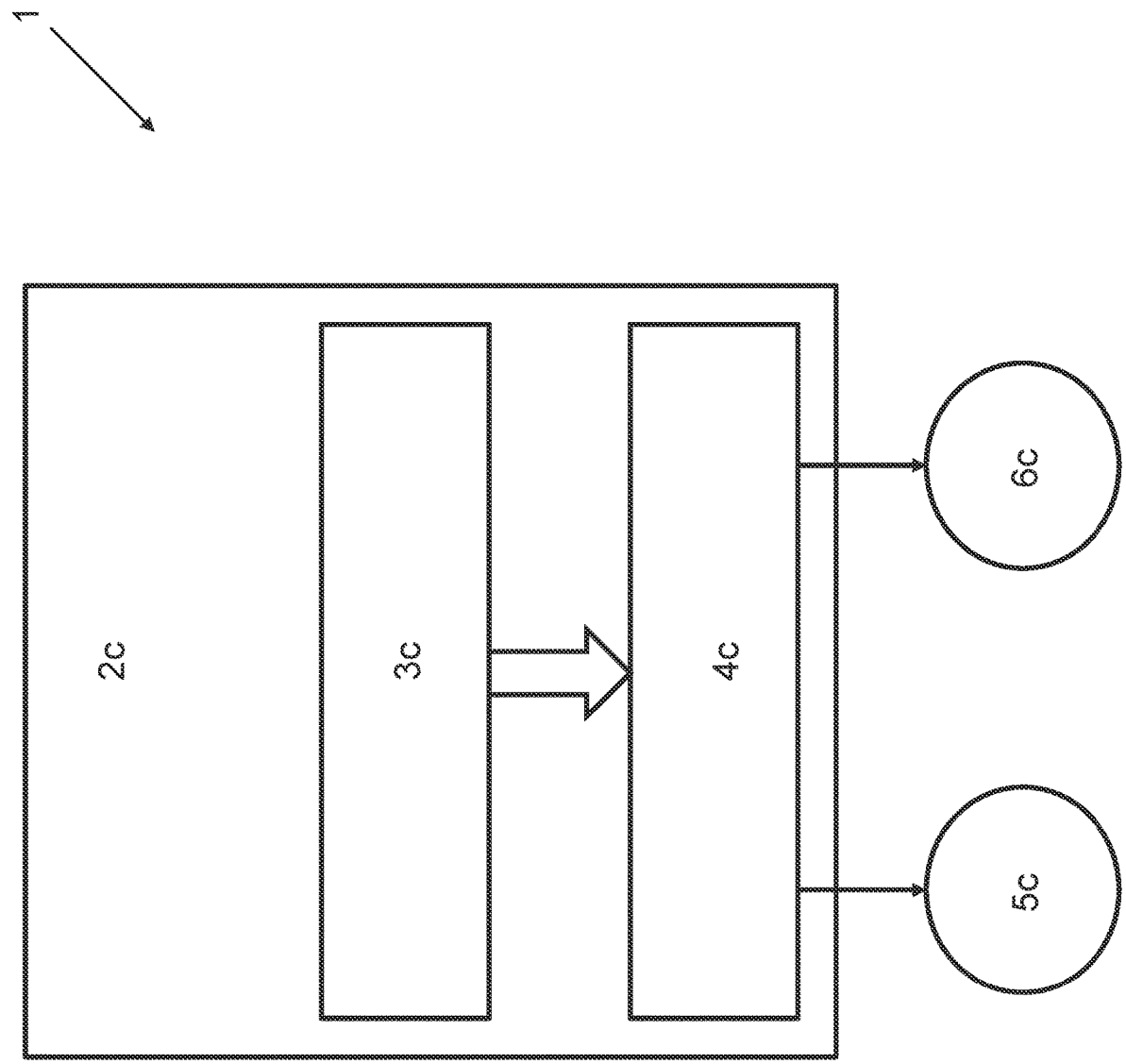
FIG. 3 schematically illustrates an HVAC: system having a controller, a driver circuit, and two stepper motors, wherein the appliance comprises the controller and the driver circuit incorporating teachings of the present disclosure.

Now referring to FIG. 3, the appliance 2c can comprise the controller 3c and also the driver circuit 4c. FIG. 3 shows a single communication channel between the appliance 2c and the first motor 5c. In some embodiments, the appliance 2c provides a plurality of communication channels for communication with the first motor 5c. In some embodiments, the number of communication channels provided by the appliance 2c for communication with the first motor 5c matches the number of windings first motor 5c. That is, a first motor 5c having four windings results in four communication channels.

The plurality of communication channels as provided by the appliance 2c for communication with the first motor 5c can be analog communication channels. In some embodiments, all communication channels of the plurality of communication channels are analog communication channels. The plurality of communication channels as provided by the appliance 2c for communication with the first motor 5c can also be digital communication channels. In some embodiments, all communication channels of the plurality of communication channels are digital communication channels.

In some embodiments, at least one communication channel provided by the appliance 2c for communication with the first motor 5c corresponds to an output pin of the appliance 2c. In some embodiments, each communication channel provided by the appliance 2c for communication with the first motor 5c corresponds to an output pin of the appliance 2c. In some embodiments, each communication channel provided by the appliance 2c for communication with the first motor 5c comprises an output pin of the appliance 2c. In some embodiments, each communication channel provided by the appliance 2c for communication with the first motor 5c is an output pin of the appliance 2c.

FIG. 3 also shows a single communication channel between the appliance 2c and the second motor 6c. In some embodiments, the appliance 2c provides a plurality of communication channels for communication with the second motor 6c. In some embodiments, the number of communication channels provided by the appliance 2c matches the number of windings second motor 6c. That is, a second motor 6c having four windings results in four communication channels.

The plurality of communication channels as provided by the appliance 2c for communication with the second motor 6c can be analog communication channels. In some embodiments, all communication channels of the plurality of communication channels are analog communication channels. The plurality of communication channels as provided by the appliance 2c for communication with the second motor 6c can also be digital communication channels. In some embodiments, all communication channels of the plurality of communication channels are digital communication channels.

In some embodiments, at least one communication channel provided by the appliance 2c for communication with the second motor 6c corresponds to an output pin of the appliance 2c. In some embodiments, each communication channel provided by the appliance 2c for communication with the second motor 6c corresponds to an output pin of the appliance 2c. In some embodiments, each communication channel provided by the appliance 2c for communication with the second motor 6c comprises an output pin of the appliance 2c. In some embodiments, each communication channel provided by the appliance 2c for communication with the second motor 6c is an output pin of the appliance 2c.

In some embodiments, the first motor 5c connected to the appliance 2c comprises a first stepper motor. The first motor 5c connected to the appliance 2c ideally is a first stepper motor. In some embodiments, the second motor 6c connected to the appliance 2c comprises a second stepper motor. In some embodiments, the second motor 6c connected to the appliance 2c is a second stepper motor.

Figure 4:
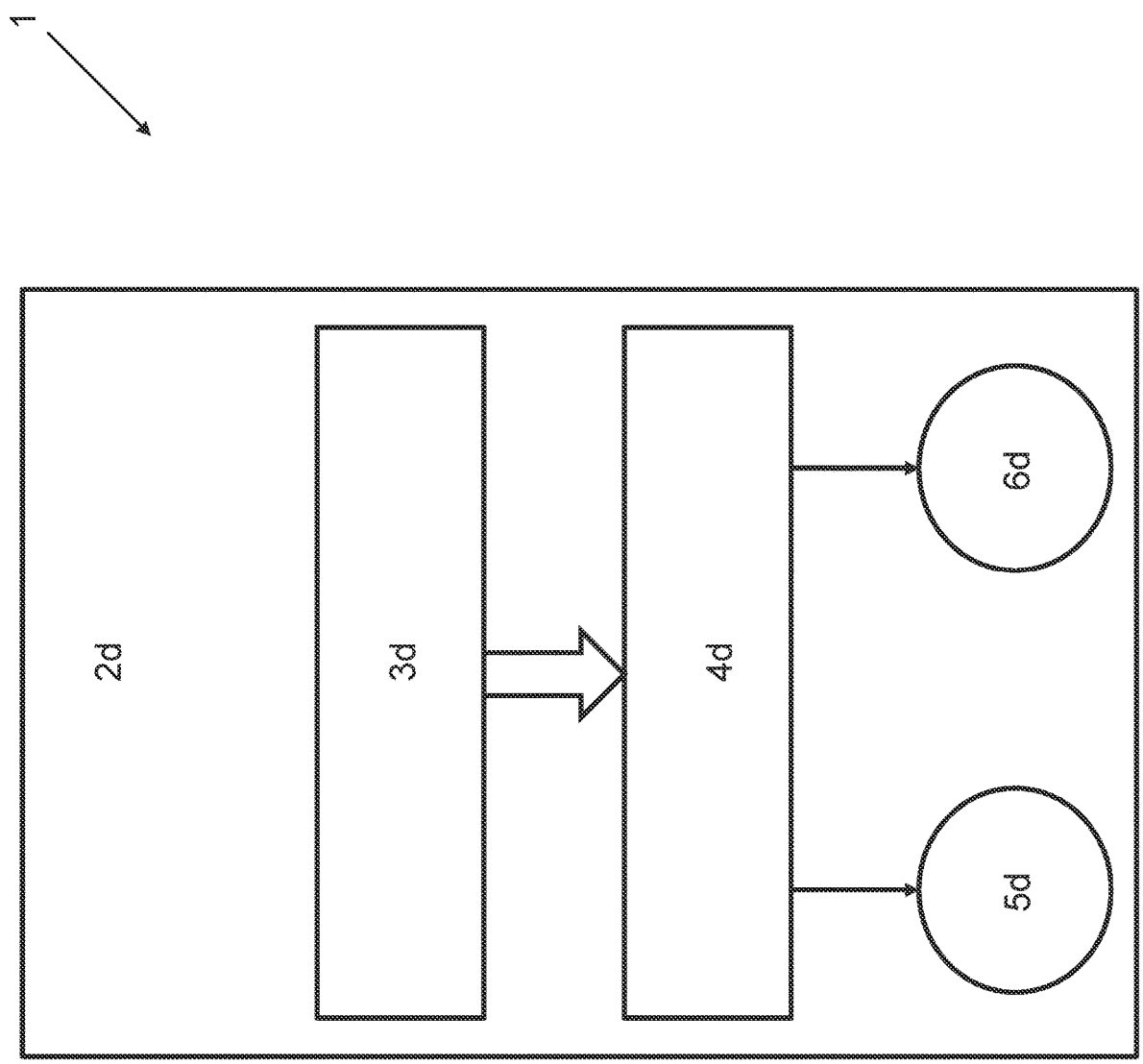
FIG. 4 schematically shows an HVAC system having a controller, a driver circuit, and two stepper motors, wherein the appliance comprises the controller, the driver circuit, and the two stepper motors incorporating teachings of the present disclosure.

Now turning to FIG. 4, the appliance 2d can comprise the controller 3d and the driver circuit 4d and the first motor 5d and the second motor 6d. In some embodiments, the first motor 5d of the appliance 2d comprises a first stepper motor. In some embodiments, the first motor 5d of the appliance 2d is a first stepper motor. In some embodiments, the second motor 6d of the appliance 2d comprises a second stepper motor. In some embodiments, the second motor 6d of the appliance 2d is a second stepper motor.

FIG. 5 illustrates conventional excitation. Conventional cycles of electric signals applied to the first motor 5a-5d and to the second motor 6a-6d are shown. The electric signals applied to the first motor 5a-5d and to the second motor 6a-6d can be electric currents. The electric signals applied to the first motor 5a-5d and to the second motor 6a-6d can also be electric voltages.

The first conventional cycle 7a corresponds to the first motor 5a-5d. That is, electric signals according to the first conventional cycle 7a are sent to the first motor 5a-5d. The second conventional cycle 7b corresponds to the second motor 6a-6d. That is, electric signals according to the second conventional cycle 7b are sent to the second motor 6a-6d.

The first motor 5a-5d is assumed to have four windings N, E, S, and W. Accordingly, the signal sequences of the first conventional cycle 7a as applied to the windings of the first motor 5a-5d are labelled 50n, 50e, 50s, and 50w. The second motor 6a-6d is also assumed to have four windings N, E, S, and W. Accordingly, the signal sequences of the second conventional cycle 8a as applied to the windings of the second motor 6a-6d are labelled 60n, 60e, 60s, and 60w.

At the beginning, an electric high signal is applied to the N winding of the first motor 5a-5d. The electric high signal is applied for two regular intervals of time. The electric high signal can, by way of non-limiting example, be an electric voltage such as 3.3 Volts or 5 Volts or 12 Volts. The electric high signal can, by way of another non-limiting example, be an electric current such as 100 Milliamperes or 200 Milliamperes or 500 Milliamperes.

After the electric high signal, an electric low signal is applied for five regular intervals of time. The electric low signal can, by way of non-limiting example, be an electric voltage such as 0 Volts or 0.1 Volts or 0.2 Volts. The electric low signal can, by way of another non-limiting example, be an electric current such as 0 Milliamperes or 1 Milliampere or 2 Milliamperes.

The signal sequence 50n applied to the N winding of the first motor 5a-5d then switches back to an electric high signal. The electric high signal is applied for another one regular interval of time. At the completion of the cycle, the signal sequence 50n as applied to the N winding starts anew and an electric high signal is applied.

In some embodiments, a regular interval of time corresponds to a duration of a pulse applied to the first motor 5a-5d. In some embodiments, the first motor 5a-5d is a first stepper motor. In some embodiments, a regular interval of time is a duration of a pulse applied to the first motor 5a-5d. In some embodiments, the first motor 5a-5d is a first stepper motor.

The first conventional cycle 7a as shown in FIG. 5 lasts eight regular intervals of time. In some embodiments, the first conventional cycle 7a as shown in FIG. 5 lasts eight pulses.

In some embodiments, a regular interval of time lasts at least 10 Milliseconds. In some embodiments, a regular interval of time lasts at least 20 Milliseconds. In some embodiments, a regular interval of time lasts at least 50 Milliseconds.

In some embodiments, a pulse lasts at least 10 Milliseconds. In some embodiments, a pulse lasts at least 20 Milliseconds. In some embodiments, a pulse lasts at least 50 Milliseconds.

At the beginning, an electric low signal is applied to the E winding of the first motor 5a-5d. The electric low signal is applied for one regular interval of time. After the electric low signal, an electric high signal is applied to the E winding of the first motor 5a-5d for three regular intervals of time. The signal sequence 50e applied to the E winding of the first motor 5a-5d then switches back to an electric low signal. The electric low signal is applied for another four regular intervals of time. At the completion of the cycle, the signal sequence 50*e* as applied to the E winding starts anew and an electric low signal is applied.

Also at the beginning, an electric low signal is applied to the S winding of the first motor 5*a*-5*d*. The electric low signal is applied for three regular intervals of time. After the electric low signal, an electric high signal is applied to the S winding of the first motor 5*a*-5*d* for three regular intervals of time. The signal sequence 50*s* applied to the S winding of the first motor 5*a*-5*d* then switches back to an electric low signal. The electric low signal is applied for another two regular intervals of time. At the completion of the cycle, the signal sequence 50*s* as applied to the S winding starts anew and an electric low signal is applied.

Also at the beginning, an electric low signal is applied to the W winding of the first motor 5*a*-5*d*. The electric low signal is applied for five regular intervals of time. After the electric low signal, an electric high signal is applied to the W winding of the first motor 5*a*-5*d* for three regular intervals of time. At the completion of the cycle, the signal sequence 50*w* as applied to the W winding starts anew and an electric low signal is applied.

The second conventional cycle 8*a* as shown in FIG. 5 is the same as the first conventional cycle 7*a*. At the beginning, an electric high signal is applied to the N winding of the second motor 6*a*-6*d*. The electric high signal is applied for two regular intervals of time. The electric high signal can, by way of non-limiting example, be an electric voltage such as 3.3 Volts or 5 Volts or 12 Volts. The electric high signal can, by way of another non-limiting example, be an electric current such as 100 Milliamperes or 200 Milliamperes or 500 Milliamperes. In some embodiments, the same (types of) electric high signals are applied to the windings of the first and second motors 5*a*-5*d*, 6*a*-6*d*.

After the electric high signal, an electric low signal is applied for five regular intervals of time. The electric low signal can, by way of non-limiting example, be an electric voltage such as 0 Volts or 0.1 Volts or 0.2 Volts. The electric low signal can, by way of another non-limiting example, be an electric current such as 0 Milliamperes or 1 Milliampere or 2 Milliamperes. In some embodiments, the same (types of) electric low signals are applied to the windings of the first and second motors 5*a*-5*d*, 6*a*-6*d*.

The signal sequence 60*n* applied to the N winding of the second motor 6*a*-6*d* then switches back to an electric high signal. The electric high signal is applied for another one regular interval of time. At the completion of the cycle, the signal sequence 60*n* as applied to the N winding starts anew and an electric high signal is applied.

In some embodiments, a regular interval of time corresponds to a duration of a pulse applied to the second motor 6*a*-6*d*. In some embodiments, the second motor 6*a*-6*d* is a second stepper motor. In some embodiments, a regular interval of time is a duration of a pulse applied to the second motor 6*a*-6*d*. In some embodiments, the second motor 6*a*-6*d* is a second stepper motor.

The second conventional cycle 8*a* as shown in FIG. 5 lasts eight regular intervals of time. In some embodiments, the second conventional cycle 8*a* as shown in FIG. 5 lasts eight pulses.

In some embodiments, a regular interval of time lasts at least 10 Milliseconds. In some embodiments, a regular interval of time lasts at least 20 Milliseconds. In some embodiments, a regular interval of time lasts at least 50 Milliseconds. In some embodiments, the same regular intervals of time apply to the windings of the first motor 5*a*-5*d* and to the windings of the second motor 6*a*-6*d*.

In some embodiments, a pulse lasts at least 10 Milliseconds. In some embodiments, pulse lasts at least 20 Milliseconds. In some embodiments, a pulse lasts at least 50 Milliseconds. In some embodiments, the same pulses are applied to the windings of the first motor 5*a*-5*d* and to the windings of the second motor 6*a*-6*d*.

At the beginning, an electric low signal is applied to the E winding of the second motor 6*a*-6*d*. The electric low signal is applied for one regular interval of time. After the electric low signal, an electric high signal is applied to the E winding of the second motor 6*a*-6*d* for three regular intervals of time. The signal sequence 60*e* applied to the E winding of the second motor 6*a*-6*d* then switches back to an electric low signal. The electric low signal is applied for another four regular intervals of time. At the completion of the cycle, the signal sequence 60*e* as applied to the E winding starts anew and an electric low signal is applied.

Also at the beginning, an electric low signal is applied to the S winding of the second motor 6*a*-6*d*. The electric low signal is applied for three regular intervals of time. After the electric low signal, an electric high signal is applied to the S winding of the second motor 6*a*-6*d* for three regular intervals of time. The signal sequence 60*s* applied to the S winding of the second motor 6*a*-6*d* then switches back to an electric low signal. The electric low signal is applied for another two regular intervals of time. At the completion of the cycle, the signal sequence 60*s* as applied to the S winding starts anew and an electric low signal is applied.

Also at the beginning, an electric low signal is applied to the W winding of the second motor 6*a*-6*d*. The electric low signal is applied for five regular intervals of time. After the electric low signal, an electric high signal is applied to the W winding of the second motor 6*a*-6*d* for three regular intervals of time. At the completion of the cycle, the signal sequence 60*w* as applied to the W winding starts anew and an electric low signal is applied.

Now turning to FIG. 6, a non-conventional and/or half-step excitation is illustrated. Half-step cycles of electric signals applied to the second motor 6*a*-6*d* are shown. The electric signals applied to the first motor 5*a*-5*d* and to the second motor 6*a*-6*d* can again be electric currents. The electric signals applied to the first motor 5*a*-5*d* and to the second motor 6*a*-6*d* can also be electric voltages.

The first half-step cycle 7*b* corresponds to the first motor 5*a*-5*d*. That is, electric signals according to the first half-step cycle 7*b* are sent to the first motor 5*a*-5*d*. The second half-step cycle 8*b* corresponds to the second motor 6*a*-6*d*. That is, electric signals according to the second half-step cycle 8*b* are sent to the second motor 6*a*-6*d*.

The first motor 5*a*-5*d* is again assumed to have four windings N, E, S, and W. Accordingly, the signal sequences of the first half-step cycle 7*b* as applied to the windings of the first motor 5*a*-5*d* are labelled 51*n*, 51*e*, 51*s*, and 51*w*. The second motor 6*a*-6*d* is also assumed to have four windings N, E, S, and W. Accordingly, the signal sequences of the second half-step cycle 8*b* as applied to the windings of the second motor 6*a*-6*d* are labelled 61*n*, 61*e*, 61*s*, and 61*w*.

The first cycle 7*b* is the same as the first conventional cycle 7*a* and the second conventional cycle 8*a*. At the beginning, an electric high signal is applied to the N winding of the first motor 5*a*-5*d*. The electric high signal is applied for two regular intervals of time. The electric high signal can, by way of non-limiting example, be an electric voltage such as 3.3 Volts or 5 Volts or 12 Volts. The electric high signal can, by way of another non-limiting example, be an electric current such as 100 Milliamperes or 200 Milliamperes or 500 Milliamperes.

After the electric high signal, an electric low signal is applied for five regular intervals of time. The electric low signal can, by way of non-limiting example, be an electric voltage such as 0 Volts or 0.1 Volts or 0.2 Volts. The electric low signal can, by way of another non-limiting example, be an electric current such as 0 Milliamperes or 1 Milliampere or 2 Milliamperes.

The signal sequence 51n applied to the N winding of the first motor 5a-5d then switches back to an electric high signal. The electric high signal is applied for another one regular interval of time. At the completion of the cycle, the signal sequence 51n as applied to the N winding starts anew and an electric high signal is applied.

In some embodiments, a regular interval of time corresponds to a duration of a pulse applied to the first motor 5a-5d. In some embodiments, the first motor 5a-5d is a first stepper motor. In some embodiments, a regular interval of time is a duration of a pulse applied to the first motor 5a-5d. In some embodiments, the first motor 5a-5d is a first stepper motor.

The first cycle 7b as shown in FIG. 6 lasts eight regular intervals of time. In some embodiments, the first cycle 7b as shown in FIG. 6 lasts eight pulses. In some embodiments, a regular interval of time lasts at least 10 Milliseconds. In some embodiments, a regular interval of time lasts at least 20 Milliseconds. In some embodiments, a regular interval of time lasts at least 50 Milliseconds. In some embodiments, a pulse lasts at least 10 Milliseconds. In some embodiments, a pulse lasts at least 20 Milliseconds. In some embodiments, a pulse lasts at least 50 Milliseconds.

At the beginning, an electric low signal is applied to the E winding of the first motor 5a-5d. The electric low signal is applied for one regular interval of time. After the electric low signal, an electric high signal is applied to the E winding of the first motor 5a-5d for three regular intervals of time. The signal sequence 51e applied to the E winding of the first motor 5a-5d then switches back to an electric low signal. The electric low signal is applied for another four regular intervals of time. At the completion of the cycle, the signal sequence 51e as applied to the E winding starts anew and an electric low signal is applied.

Also at the beginning, an electric low signal is applied to the S winding of the first motor 5a-5d. The electric low signal is applied for three regular intervals of time. After the electric low signal, an electric high signal is applied to the S winding of the first motor 5a-5d for three regular intervals of time. The signal sequence 51s applied to the S winding of the first motor 5a-5d then switches back to an electric low signal. The electric low signal is applied for another two regular intervals of time. At the completion of the cycle, the signal sequence 51s as applied to the S winding starts anew and an electric low signal is applied.

Also at the beginning, an electric low signal is applied to the W winding of the first motor 5a-5d. The electric low signal is applied for five regular intervals of time. After the electric low signal, an electric high signal is applied to the W winding of the first motor 5a-5d for three regular intervals of time. At the completion of the cycle, the signal sequence 51w as applied to the W winding starts anew and an electric low signal is applied.

The second half-step cycle 8b as shown in FIG. 6 is not the same as the first cycle 7b. Instead, the second half-step cycle 8b is shifted by one regular interval of time with respect to the first cycle 7b. More specifically, the second half-step cycle 8b is shifted forward by one regular interval of time.

In some embodiments, a regular interval of time corresponds to a duration of a pulse applied to the second motor 6a-6d. In some embodiments, the second motor 6a-6d is a second stepper motor. In some embodiments, a regular interval of time is a duration of a pulse applied to the second motor 6a-6d. In some embodiments, the second motor 6a-6d is a second stepper motor.

The second half-step cycle 8b as shown in FIG. 6 lasts eight regular intervals of time. In some embodiments, the second half-step cycle 8b as shown in FIG. 6 lasts eight pulses.

In some embodiments, a regular interval of time lasts at least 10 Milliseconds. In some embodiments, a regular interval of time lasts at least 20 Milliseconds. In some embodiments, a regular interval of time lasts at least 50 Milliseconds. In some embodiments, the same regular intervals of time apply to the windings of the first motor 5a-5d and to the windings of the second motor 6a-6d.

In some embodiments, a pulse lasts at least 10 Milliseconds. In some embodiments, a pulse lasts at least 20 Milliseconds. In some embodiments, a pulse lasts at least 50 Milliseconds. In some embodiments, the same pulses are applied to the windings of the first motor 5a-5d and to the windings of the second motor 6a-6d.

At the beginning, an electric high signal is applied to the N winding of the second motor 6a-6d. The electric high signal is applied for three regular intervals of time. The electric high signal can, by way of non-limiting example, be an electric voltage such as 3.3 Volts or 5 Volts or 12 Volts. The electric high signal can, by way of another non-limiting example, be an electric current such as 100 Milliamperes or 200 Milliamperes or 500 Milliamperes. In some embodiments, the same (types of) electric high signals are applied to the windings of the first and second motors 5a-5d, 6a-6d.

After the electric high signal, an electric low signal is applied for five regular intervals of time. The electric low signal can, by way of non-limiting example, be an electric voltage such as 0 Volts or 0.1 Volts or 0.2 Volts. The electric low signal can, by way of another non-limiting example, be an electric current such as 0 Milliamperes or 1 Milliampere or 2 Milliamperes. In some embodiments, the same (types of) electric low signals are applied to the windings of the first and second motors 5a-5d, 6a-6d.

The signal sequence 61n applied to the N winding of the second motor 6a-6d then switches back to an electric high signal. At the completion of the cycle, the signal sequence 61n as applied to the N winding starts anew and an electric high signal is applied.

At the beginning, an electric low signal is applied to the E winding of the second motor 6a-6d. The electric low signal is applied for two regular intervals of time. After the electric low signal, an electric high signal is applied to the E winding of the second motor 6a-6d for three regular intervals of time. The signal sequence 61e applied to the E winding of the second motor 6a-6d then switches back to an electric low signal. The electric low signal is applied for another three regular intervals of time. At the completion of the cycle, the signal sequence 61e as applied to the E winding starts anew and an electric low signal is applied.

Also at the beginning, an electric low signal is applied to the S winding of the second motor 6a-6d. The electric low signal is applied for four regular intervals of time. After the electric low signal, an electric high signal is applied to the S winding of the second motor 6a-6d for three regular intervals of time. The signal sequence 61s applied to the S winding of the second motor 6a-6d then switches back to an electric low signal. The electric low signal is applied for another one regular interval of time. At the completion of the cycle, the signal sequence 61s as applied to the S winding starts anew and an electric low signal is applied.

Also at the beginning, an electric high signal is applied to the W winding of the second motor 6a-6d. The electric high signal is applied for one regular interval of time. After the electric high signal, an electric low signal is applied to the W winding of the second motor 6a-6d for five regular intervals of time. The signal sequence 61s applied to the W winding of the second motor 6a-6d then switches back to an electric high signal. The electric high signal is applied for another two regular intervals of time. At the completion of the cycle, the signal sequence 61w as applied to the W winding starts anew and an electric high signal is applied.

Any steps carried out by a control assembly 3a-3d, 4a-4d of the present disclosure can be embodied in hardware and/or in a software module executed by a processor and/or in a software module executed by a processor inside a container using operating system level virtualisation and/or in a cloud computing arrangement, or in a combination thereof. The software may include a firmware and/or a hardware driver run by the operating system and/or an application program. Thus, the disclosure also relates to a computer program product for performing the operations presented herein. If implemented in software, the functions described may be stored as one or more instructions on a computer-readable medium. Storage media that can be used include, by way of non-limiting examples, random access memory (RAM) and/or read only memory (ROM) and/or flash memory. Storage media can, by way of non-limiting examples, also include EPROM memory and/or EEPROM memory and/or registers and/or a hard disk and/or a removable disk. Further storage media can, by way of non-limiting examples, include other optical disks and/or any available media that can be accessed by a computer. Storage media can still, by way of non-limiting example, include any other IT equipment and appliance.

As described in detail herein, the present disclosure deals with a HVAC system 1 comprising an appliance 2a-2d, a control assembly 3a-3d, 4a-4d in operative communication with the appliance 2a-2d, a first motor 5a-5d in operative communication with the control assembly 3a-3d, 4a-4d, and a second motor 6a-6d in operative communication with the control assembly 3a-3d, 4a-4d, wherein the first motor 5a-5d acts on a coolant and/or heating medium flowing through the system 1 and has a first winding having a first terminal and a second terminal; wherein the second motor 6a-6d acts on a coolant and/or heating medium flowing through the system 1 and has a first winding having a first terminal and a second terminal; wherein the first winding of the first motor 5a-5d is different from the first winding of the second motor 6a-6d; the control assembly 3a-3d, 4a-4d being configured to: apply a first electric signal selected from an electric high signal and an electric low signal to the first terminal of the first winding of the first motor 5a-5d for a first number of regular intervals of time; after the application of the first electric signal to the first terminal of the first winding of the first motor 5a-5d, apply a second electric signal selected from an electric low signal and an electric high signal to the first terminal of the first winding of the first motor 5a-5d, the second electric signal being different from the first electric signal; apply the first electric signal to the first terminal of the first winding of the second motor 6a-6d for a second number of regular intervals of time; and after the application of the first electric signal to the first terminal of the first winding of the second motor 6a-6d, apply the second electric signal to the first terminal of the first winding of the second motor 6a-6d; wherein the first number of regular intervals of time and the second number of regular intervals of time differ by one regular interval of time.

In some embodiments, the system 1 comprises a coolant and/or heating medium. In some embodiments, the coolant and/or heating medium circulates through the system 1.

In some embodiments, the second motor 6a-6d acts on the same coolant and/or heating medium flowing through the system 1 as the first motor 5a-5d. The first terminal of the first winding of the first motor 5a-5d is different from the second terminal of the first winding of the first motor 5a-5d. The first terminal of the first winding of the second motor 6a-6d is different from the second terminal of the first winding of the second motor 6a-6d. The first terminal of the first winding of the first motor 5a-5d is in operative communication with the control assembly 3a-3d, 4a-4d. The first terminal of the first winding of the second motor 6a-6d is in operative communication with the control assembly 3a-3d, 4a-4d.

The electric high signal is different from the electric low signal.

In some embodiments, the control assembly 3a-3d, 4a-4d is configured to apply the same first electric signal as applied to the first terminal of the first winding of the first motor 5a-5d also to the first terminal of the first winding of the second motor 6a-6d for the second number of regular intervals of time.

The first number of regular intervals of time exceeds zero. The first number of regular intervals of time ideally is a natural number of regular intervals of time. The second number of regular intervals of time exceeds zero. In some embodiments, the second number of regular intervals of time is a natural number of regular intervals of time.

In some embodiments, the first number of regular intervals of time exceeds the second number of regular intervals of time by one regular interval of time. In some embodiments, the second number of regular intervals of time exceeds the first number of regular intervals of time by one regular interval of time.

In some embodiments, the control assembly 3a-3d, 4a-4d being configured to: after the application of the first electric signal to the first terminal of the first winding of the first motor 5a-5d, apply the second electric signal to the first terminal of the first winding of the first motor 5a-5d for a third number of regular intervals of time; and after the application of the first electric signal to the first terminal of the first winding of the second motor 6a-6d, apply the second electric signal to the first terminal of the first winding of the second motor 6a-6d for a fourth number of regular intervals of time.

In some embodiments, the third number of regular intervals of time exceeds zero. In some embodiments, the third number of regular intervals of time is a natural number of regular intervals of time. The fourth number of regular intervals of time exceeds zero. In some embodiments, the fourth number of regular intervals of time is a natural number of regular intervals of time.

In some embodiments, the third number of regular intervals of time is different from the first number of regular intervals of time. In some embodiments, the fourth number of regular intervals of time is different from the second number of regular intervals of time. In some embodiments, the third number of regular intervals of time equals the fourth number of regular intervals of time.

In some embodiments, the system 1 applies an electric signal for a third number of regular intervals of time, the control assembly 3a-3d, 4a-4d being configured to: after the application of the second electric signal to the first terminal of the first winding of the first motor 5a-5d for the third number of regular intervals of time, apply the first electric signal to the first terminal of the first winding of the first motor 5a-5d; and after the application of the second electric signal to the first terminal of the first winding of the second motor 6a-6d for the fourth number of regular intervals of time, apply the first electric signal to the first terminal of the first winding of the second motor 6a-6d.

In some embodiments, the first motor 5a-5d has a second winding having a first terminal and a second terminal; wherein the second motor 6a-6d has a second winding having a first terminal and a second terminal; wherein the second winding of the first motor 5a-5d is different from the second winding of the second motor 6a-6d; the control assembly 3a-3d, 4a-4d being configured to: apply the second electric signal to the first terminal of the second winding of the first motor 5a-5d for a fifth number of regular intervals of time; after the application of the second electric signal to the first terminal of the second winding of the first motor 5a-5d, apply the first electric signal to the first terminal of the second winding of the first motor 5a-5d; apply the second electric signal to the first terminal of the second winding of the second motor 6a-6d for a sixth number of regular intervals of time; and after the application of the second electric signal to the first terminal of the second winding of the second motor 6a-6d, apply the first electric signal to the first terminal of the second winding of the second motor 6a-6d; wherein the fifth number of regular intervals of time and the sixth number of regular intervals of time differ by one regular interval of time.

The second winding of the first motor 5a-5d is different from the first winding of the first motor 5a-5d. The second winding of the second motor 6a-6d is different from the first winding of the second motor 6a-6d. The first terminal of the second winding of the first motor 5a-5d is different from the second terminal of the second winding of the first motor 5a-5d. The first terminal of the second winding of the second motor 6a-6d is different from the second terminal of the second winding of the second motor 6a-6d.

In some embodiments, the fifth number of regular intervals of time exceeds zero. In some embodiments, the fifth number of regular intervals of time is a natural number of regular intervals of time. In some embodiments, the sixth number of regular intervals of time exceeds zero. In some embodiments, the sixth number of regular intervals of time is a natural number of regular intervals of time.

In some embodiments, the fifth number of regular intervals of time is different from the first number of regular intervals of time. In some embodiments, the sixth number of regular intervals of time is different from the second number of regular intervals of time.

In some embodiments, the fifth number of regular intervals of time exceeds the sixth number of regular intervals of time by one regular interval of time. In some embodiments, the sixth number of regular intervals of time exceeds the fifth number of regular intervals of time by one regular interval of time.

In some embodiments, the system 1 applies an electric signal for a fifth number of regular intervals of time, the control assembly 3a-3d, 4a-4d being configured to: after the application of the second electric signal to the first terminal of the second winding of the first motor 5a-5d, apply the first electric signal to the first terminal of the second winding of the first motor 5a-5d for a seventh number of regular intervals of time; and after the application of the second electric signal to the first terminal of the second winding of the second motor 6a-6d, apply the first electric signal to the first terminal of the second winding of the second motor 6a-6d for an eighth number of regular intervals of time.

In some embodiments, the seventh number of regular intervals of time exceeds zero. In some embodiments, the seventh number of regular intervals of time is a natural number of regular intervals of time. In some embodiments, the eighth number of regular intervals of time exceeds zero. In some embodiments, the eighth number of regular intervals of time is a natural number of regular intervals of time.

In some embodiments, the seventh number of regular intervals of time is different from the fifth number of regular intervals of time. In some embodiments, the eighth number of regular intervals of time is different from the sixth number of regular intervals of time. In some embodiments, he fifth number of regular intervals of time equals the sixth number of regular intervals of time.

In some embodiments, the system 1 applies an electric signal for a seventh number of regular intervals of time, the control assembly 3a-3d, 4a-4d being configured to: after the application of the first electric signal to the first terminal of the second winding of the first motor 5a-5d for the seventh number of regular intervals of time, apply the second electric signal to the first terminal of the second winding of the first motor 5a-5d; and after the application of the first electric signal to the first terminal of the second winding of the second motor 6a-6d for the eighth number of regular intervals of time, apply the second electric signal to the first terminal of the second winding of the second motor 6a-6d.

In some embodiments, the first motor 5a-5d has a third winding having a first terminal and a second terminal; wherein the second motor 6a-6d has a third winding having a first terminal and a second terminal; wherein the third winding of the first motor 5a-5d is different from the third winding of the second motor 6a-6d; the control assembly 3a-3d, 4a-4d being configured to: apply the second electric signal to the first terminal of the third winding of the first motor 5a-5d for a ninth number of regular intervals of time; after the application of the second electric signal to the first terminal of the third winding of the first motor 5a-5d, apply the first electric signal to the first terminal of the third winding of the first motor 5a-5d; apply the second electric signal to the first terminal of the third winding of the second motor 6a-6d for a tenth number of regular intervals of time; and after the application of the second electric signal to the first terminal of the third winding of the second motor 6a-6d, apply the first electric signal to the first terminal of the third winding of the second motor 6a-6d; wherein the ninth number of regular intervals of time and the tenth number of regular intervals of time differ by one regular interval of time.

The third winding of the first motor 5a-5d is different from the first winding of the first motor 5a-5d. The third winding of the second motor 6a-6d is different from the first winding of the second motor 6a-6d. The third winding of the first motor 5a-5d is different from the second winding of the first motor 5a-5d. The third winding of the second motor 6a-6d is different from the second winding of the second motor 6a-6d.

The first terminal of the third winding of the first motor 5a-5d is different from the second terminal of the third winding of the first motor 5a-5d. The first terminal of the third winding of the second motor 6a-6d is different from the second terminal of the third winding of the second motor 6a-6d.

In some embodiments, the ninth number of regular intervals of time exceeds zero. In some embodiments, the ninth number of regular intervals of time is a natural number of regular intervals of time. In some embodiments, the tenth number of regular intervals of time exceeds zero. In some embodiments, the tenth number of regular intervals of time is a natural number of regular intervals of time.

In some embodiments, the ninth number of regular intervals of time is different from the first number of regular intervals of time. In some embodiments, the tenth number of regular intervals of time is different from the second number of regular intervals of time. In some embodiments, the ninth number of regular intervals of time is different from the fifth number of regular intervals of time. In some embodiments, the tenth number of regular intervals of time is different from the sixth number of regular intervals of time.

In some embodiments, the ninth number of regular intervals of time exceeds the tenth number of regular intervals of time by one regular interval of time. In some embodiments, the tenth number of regular intervals of time exceeds the ninth number of regular intervals of time by one regular interval of time.

In some embodiments, the system 1 applies an electric signal for a ninth number of regular intervals of time, the control assembly 3a-3d, 4a-4d being configured to: after the application of the second electric signal to the first terminal of the third winding of the first motor 5a-5d, apply the first electric signal to the first terminal of the third winding of the first motor 5a-5d for an eleventh number of regular intervals of time; and after the application of the second electric signal to the first terminal of the third winding of the second motor 6a-6d, apply the first electric signal to the first terminal of the third winding of the second motor 6a-6d for a twelfth number of regular intervals of time.

In some embodiments, the eleventh number of regular intervals of time exceeds zero. In some embodiments, the eleventh number of regular intervals of time is a natural number of regular intervals of time. In some embodiments, the twelfth number of regular intervals of time exceeds zero. In some embodiments, the twelfth number of regular intervals of time is a natural number of regular intervals of time.

In some embodiments, the eleventh number of regular intervals of time is different from the ninth number of regular intervals of time. In some embodiments, the twelfth number of regular intervals of time is different from the tenth number of regular intervals of time. In some embodiments, the eleventh number of regular intervals of time equals the twelfth number of regular intervals of time.

In some embodiments, the system 1 applies an electric signal for an eleventh number of regular intervals of time, the control assembly 3a-3d, 4a-4d being configured to: after the application of the first electric signal to the first terminal of the third winding of the first motor 5a-5d for the eleventh number of regular intervals of time, apply the second electric signal to the first terminal of the third winding of the first motor 5a-5d; and after the application of the first electric signal to the first terminal of the third winding of the second motor 6a-6d for the twelfth number of regular intervals of time, apply the second electric signal to the first terminal of the third winding of the second motor 6a-6d.

In some embodiments, the first motor 5a-5d has a fourth winding having a first terminal and a second terminal; wherein the second motor 6a-6d has a fourth winding having a first terminal and a second terminal; wherein the fourth winding of the first motor 5a-5d is different from the fourth winding of the second motor 6a-6d; the control assembly 3a-3d, 4a-4d being configured to: apply the second electric signal to the first terminal of the fourth winding of the first motor 5a-5d for a thirteenth number of regular intervals of time; after the application of the second electric signal to the first terminal of the fourth winding of the first motor 5a-5d, apply the first electric signal to the first terminal of the fourth winding of the first motor 5a-5d; apply the first electric signal to the first terminal of the fourth winding of the second motor 6a-6d for a fourteenth number of regular intervals of time; and after the application of the first electric signal to the first terminal of the fourth winding of the second motor 6a-6d, apply the second electric signal to the first terminal of the fourth winding of the second motor 6a-6d; wherein the thirteenth number of regular intervals of time and the fourteenth number of regular intervals of time differ by at least one regular interval of time.

The fourth winding of the first motor 5a-5d is different from the first winding of the first motor 5a-5d. The fourth winding of the second motor 6a-6d is different from the first winding of the second motor 6a-6d. The fourth winding of the first motor 5a-5d is different from the second winding of the first motor 5a-5d. The fourth winding of the second motor 6a-6d is different from the second winding of the second motor 6a-6d. The fourth winding of the first motor 5a-5d is different from the third winding of the first motor 5a-5d. The fourth winding of the second motor 6a-6d is different from the third winding of the second motor 6a-6d.

The first terminal of the fourth winding of the first motor 5a-5d is different from the second terminal of the fourth winding of the first motor 5a-5d. The first terminal of the fourth winding of the second motor 6a-6d is different from the second terminal of the fourth winding of the second motor 6a-6d.

In some embodiments, the thirteenth number of regular intervals of time exceeds zero. In some embodiments, the thirteenth number of regular intervals of time is a natural number of regular intervals of time. In some embodiments, the fourteenth number of regular intervals of time exceeds zero. In some embodiments, the fourteenth number of regular intervals of time is a natural number of regular intervals of time.

In some embodiments, the thirteenth number of regular intervals of time is different from the first number of regular intervals of time. In some embodiments, the fourteenth number of regular intervals of time is different from the second number of regular intervals of time. In some embodiments, the thirteenth number of regular intervals of time is different from the fifth number of regular intervals of time. In some embodiments, the fourteenth number of regular intervals of time is different from the sixth number of regular intervals of time. In some embodiments, the thirteenth number of regular intervals of time is different from the ninth number of regular intervals of time. In some embodiments, the fourteenth number of regular intervals of time is different from the tenth number of regular intervals of time.

In some embodiments, the thirteenth number of regular intervals of time exceeds the fourteenth number of regular intervals of time by four regular intervals of time. In some embodiments, the fourteenth number of regular intervals of time exceeds the thirteenth number of regular intervals of time by four regular intervals of time.

In some embodiments, the system 1 applying an electric signal for a thirteenth number of regular intervals of time, the control assembly 3a-3d, 4a-4d being configured to: after the application of the second electric signal to the first terminal of the fourth winding of the first motor 5a-5d, apply the first electric signal to the first terminal of the fourth winding of the first motor 5a-5d for a fifteenth number of regular intervals of time; and after the application of the first electric signal to the first terminal of the fourth winding of the second motor 6a-6d, apply the second electric signal to the first terminal of the fourth winding of the second motor 6a-6d for a sixteenth number of regular intervals of time; wherein the fifteenth number of regular intervals of time and the sixteenth number of regular intervals of time differ by at least one regular interval of time.

In some embodiments, the fifteenth number of regular intervals of time exceeds zero. In some embodiments, the fifteenth number of regular intervals of time is a natural number of regular intervals of time. In some embodiments, the sixteenth number of regular intervals of time exceeds zero. In some embodiments, the sixteenth number of regular intervals of time is a natural number of regular intervals of time.

In some embodiments, the fifteenth number of regular intervals of time is different from the thirteenth number of regular intervals of time. In some embodiments, the sixteenth number of regular intervals of time is different from the fourteenth number of regular intervals of time.

In some embodiments, the system 1 applies an electric signal for a fifteenth number of regular intervals of time, the control assembly 3a-3d, 4a-4d being configured to: after the application of the first electric signal to the first terminal of the fourth winding of the first motor 5a-5d for the fifteenth number of regular intervals of time, apply the second electric signal to the first terminal of the fourth winding of the first motor 5a-5d; and after the application of the second electric signal to the first terminal of the fourth winding of the second motor 6a-6d for the sixteenth number of regular intervals of time, apply the first electric signal to the first terminal of the fourth winding of the second motor 6a-6d.

In some embodiments, there are first and second motors 5a-5d, 6a-6d, each motor 5a-5d, 6a-6d having first, second, third, and fourth windings, wherein the second terminal of the first winding of the first motor 5a-5d electrically connects to the second terminal of the second winding of the first motor 5a-5d; wherein the second terminal of the second winding of the first motor 5a-5d electrically connects to the second terminal of the third winding of the first motor 5a-5d; wherein the second terminal of the third winding of the first motor 5a-5d electrically connects to the second terminal of the fourth winding of the first motor 5a-5d; wherein the second terminal of the first winding of the second motor 6a-6d electrically connects to the second terminal of the second winding of the second motor 6a-6d; wherein the second terminal of the second winding of the second motor 6a-6d electrically connects to the second terminal of the third winding of the second motor 6a-6d; and wherein the second terminal of the third winding of the second motor 6a-6d electrically connects to the second terminal of the fourth winding of the second motor 6a-6d.

In some embodiments, there are first, second, third, and fourth windings, wherein the second terminal of the first winding of the first motor 5a-5d galvanically connects to the second terminal of the second winding of the first motor 5a-5d; wherein the second terminal of the second winding of the first motor 5a-5d galvanically connects to the second terminal of the third winding of the first motor 5a-5d; wherein the second terminal of the third winding of the first motor 5a-5d galvanically connects to the second terminal of the fourth winding of the first motor 5a-5d; wherein the second terminal of the first winding of the second motor 6a-6d galvanically connects to the second terminal of the second winding of the second motor 6a-6d; wherein the second terminal of the second winding of the second motor 6a-6d galvanically connects to the second terminal of the third winding of the second motor 6a-6d; and wherein the second terminal of the third winding of the second motor 6a-6d galvanically connects to the second terminal of the fourth winding of the second motor 6a-6d.

In some embodiments, there are first and second motors 5a-5d, 6a-6d wherein the second terminal of the first winding of the first motor 5a-5d electrically connects to the first terminal of the second winding of the first motor 5a-5d; wherein the second terminal of the second winding of the first motor 5a-5d electrically connects to the first terminal of the third winding of the first motor 5a-5d; wherein the second terminal of the third winding of the first motor 5a-5d electrically connects to the first terminal of the fourth winding of the first motor 5a-5d; wherein the second terminal of the fourth winding of the first motor 5a-5d electrically connects to the first terminal of the first winding of the first motor 5a-5d; wherein the second terminal of the first winding of the second motor 6a-6d electrically connects to the first terminal of the second winding of the second motor 6a-6d; wherein the second terminal of the second winding of the second motor 6a-6d electrically connects to the first terminal of the third winding of the second motor 6a-6d; wherein the second terminal of the third winding of the second motor 6a-6d electrically connects to the first terminal of the fourth winding of the second motor 6a-6d; and wherein the second terminal of the fourth winding of the second motor 6a-6d electrically connects to the first terminal of the first winding of the second motor 6a-6d.

In some embodiments, there are first and second motors 5a-5d, 6a-6d, each motor 5a-5d, 6a-6d having first, second, third, and fourth windings, wherein the second terminal of the first winding of the first motor 5a-5d galvanically connects to the first terminal of the second winding of the first motor 5a-5d; wherein the second terminal of the second winding of the first motor 5a-5d galvanically connects to the first terminal of the third winding of the first motor 5a-5d; wherein the second terminal of the third winding of the first motor 5a-5d galvanically connects to the first terminal of the fourth winding of the first motor 5a-5d; wherein the second terminal of the fourth winding of the first motor 5a-5d galvanically connects to the first terminal of the first winding of the first motor 5a-5d; wherein the second terminal of the first winding of the second motor 6a-6d galvanically connects to the first terminal of the second winding of the second motor 6a-6d; wherein the second terminal of the second winding of the second motor 6a-6d galvanically connects to the first terminal of the third winding of the second motor 6a-6d; wherein the second terminal of the third winding of the second motor 6a-6d galvanically connects to the first terminal of the fourth winding of the second motor 6a-6d; and wherein the second terminal of the fourth winding of the second motor 6a-6d galvanically connects to the first terminal of the first winding of the second motor 6a-6d.

In some embodiments, the control assembly 3a-3d, 4a-4d comprises a controller 3a-3d and a driver circuit 4a-4d having a plurality of amplifiers; wherein the controller 3a-3d is in operative communication with the driver circuit 4a-4d and in operative communication with the appliance 2a-2d; and wherein the driver circuit 4a-4d is in operative communication with the first motor 5a-5d and with the second motor 6a-6d.

It should be understood that the foregoing relates only to certain embodiments of the disclosure and that numerous changes can be made therein without departing from the scope of the disclosure. It should also be understood that the disclosure is not restricted to the illustrated embodiments and that various modifications can be made within the scope of the disclosure.

REFERENCE NUMERALS 1 system for heating and/or ventilation and/or air-conditioning
2a-2d appliance
3a-3d controller
4a-4d driver circuit
5a-5d first motor
6a-6d second motor
7a first conventional cycle
8a second conventional cycle
7b first half-step cycle
8b second half-step cycle
50n, 50e, 50s, 50w signal sequences of the first conventional cycle
60n, 60e, 60s, 60w signal sequences of the second conventional cycle
51n, 51e, 51s, 51w signal sequences of the first half-cycle
61n, 61e, 61s, 61w signal sequences of the second half-cycle

The invention claimed is:

1. A system for heating and/or ventilation and/or air-conditioning, the system comprising:
an appliance;
a control assembly in operative communication with the appliance, the control assembly including a driver circuit and a controller;
a first motor in operative communication with the control assembly; and
a second motor in operative communication with the control assembly;
wherein the first motor acts on a coolant and/or heating medium flowing through the system and has a first winding having a first terminal and a second terminal;
wherein the second motor acts on the coolant and/or heating medium flowing through the system and has a second winding having a first terminal and a second terminal;
wherein the first winding of the first motor is different from the second winding of the second motor;
the control assembly configured to:
apply a first electric signal selected from an electric high signal and an electric low signal to the first terminal of the first winding for a first number of regular intervals of time;
after the application of the first electric signal to the first terminal of the first winding, apply a second electric signal selected from an electric low signal and an electric high signal to the first terminal of the first winding, wherein the second electric signal is different from the first electric signal;
apply the first electric signal to the first terminal of the second winding for a second number of regular intervals of time; and
after the application of the first electric signal to the first terminal of the second winding, apply the second electric signal to the first terminal of the second winding;
wherein the first number of regular intervals of time and the second number of regular intervals of time differ by one regular interval of time.

2. The system for heating and/or ventilation and/or air-conditioning according to claim 1, the control assembly being configured to:
after the application of the first electric signal to the first terminal of the first winding of the first motor, apply the second electric signal to the first terminal of the first winding of the first motor for a third number of regular intervals of time; and
after the application of the first electric signal to the first terminal of the first winding of the second motor, apply the second electric signal to the first terminal of the first winding of the second motor for a fourth number of regular intervals of time.

3. The system for heating and/or ventilation and/or air-conditioning according to claim 2, the control assembly being configured to:
after the application of the second electric signal to the first terminal of the first winding of the first motor for the third number of regular intervals of time, apply the first electric signal to the first terminal of the first winding of the first motor; and
after the application of the second electric signal to the first terminal of the first winding of the second motor for the fourth number of regular intervals of time, apply the first electric signal to the first terminal of the first winding of the second motor.

4. The system for heating and/or ventilation and/or air-conditioning according to claim 3,
wherein the first motor has a second winding having a first terminal and a second terminal;
wherein the second motor has a second winding having a first terminal and a second terminal;
wherein the second winding of the first motor is different from the second winding of the second motor;
the control assembly further configured to:
apply the second electric signal to the first terminal of the second winding of the first motor for a fifth number of regular intervals of time;
after the application of the second electric signal to the first terminal of the second winding of the first motor, apply the first electric signal to the first terminal of the second winding of the first motor;
apply the second electric signal to the first terminal of the second winding of the second motor for a sixth number of regular intervals of time; and
after the application of the second electric signal to the first terminal of the second winding of the second motor, apply the first electric signal to the first terminal of the second winding of the second motor;
wherein the fifth number of regular intervals of time and the sixth number of regular intervals of time differ by one regular interval of time.

5. The system for heating and/or ventilation and/or air-conditioning according to claim 4, the control assembly further configured to:
after the application of the second electric signal to the first terminal of the second winding of the first motor, apply the first electric signal to the first terminal of the second winding of the first motor for a seventh number of regular intervals of time; and
after the application of the second electric signal to the first terminal of the second winding of the second motor, apply the first electric signal to the first terminal of the second winding of the second motor for an eighth number of regular intervals of time.

6. The system for heating and/or ventilation and/or air-conditioning according to claim 5, the control assembly further configured to:
after the application of the first electric signal to the first terminal of the second winding of the first motor for the seventh number of regular intervals of time, apply the second electric signal to the first terminal of the second winding of the first motor; and
after the application of the first electric signal to the first terminal of the second winding of the second motor for the eighth number of regular intervals of time, apply the second electric signal to the first terminal of the second winding of the second motor.

7. The system for heating and/or ventilation and/or air-conditioning according to claim 6,
wherein the first motor has a third winding having a first terminal and a second terminal;
wherein the second motor has a third winding having a first terminal and a second terminal;
wherein the third winding of the first motor is different from the third winding of the second motor;
the control assembly is further configured to:
apply the second electric signal to the first terminal of the third winding of the first motor for a ninth number of regular intervals of time;
after the application of the second electric signal to the first terminal of the third winding of the first motor, apply the first electric signal to the first terminal of the third winding of the first motor;
apply the second electric signal to the first terminal of the third winding of the second motor for a tenth number of regular intervals of time; and
after the application of the second electric signal to the first terminal of the third winding of the second motor, apply the first electric signal to the first terminal of the third winding of the second motor;
wherein the ninth number of regular intervals of time and the tenth number of regular intervals of time differ by one regular interval of time.

8. The system for heating and/or ventilation and/or air-conditioning according to claim 7, the control assembly further configured to:
after the application of the second electric signal to the first terminal of the third winding of the first motor, apply the first electric signal to the first terminal of the third winding of the first motor for an eleventh number of regular intervals of time; and
after the application of the second electric signal to the first terminal of the third winding of the second motor, apply the first electric signal to the first terminal of the third winding of the second motor for a twelfth number of regular intervals of time.

9. The system for heating and/or ventilation and/or air-conditioning according to claim 8, the control assembly further configured to:
after the application of the first electric signal to the first terminal of the third winding of the first motor for the eleventh number of regular intervals of time, apply the second electric signal to the first terminal of the third winding of the first motor; and
after the application of the first electric signal to the first terminal of the third winding of the second motor for the twelfth number of regular intervals of time, apply the second electric signal to the first terminal of the third winding of the second motor.

10. The system for heating and/or ventilation and/or air-conditioning according to claim 9,
wherein the first motor has a fourth winding having a first terminal and a second terminal;
wherein the second motor has a fourth winding having a first terminal and a second terminal;
wherein the fourth winding of the first motor is different from the fourth winding of the second motor;
the control assembly further configured to:
apply the second electric signal to the first terminal of the fourth winding of the first motor for a thirteenth number of regular intervals of time;
after the application of the second electric signal to the first terminal of the fourth winding of the first motor, apply the first electric signal to the first terminal of the fourth winding of the first motor;
apply the first electric signal to the first terminal of the fourth winding of the second motor for a fourteenth number of regular intervals of time; and
after the application of the first electric signal to the first terminal of the fourth winding of the second motor, apply the second electric signal to the first terminal of the fourth winding of the second motor;
wherein the thirteenth number of regular intervals of time and the fourteenth number of regular intervals of time differ by at least one regular interval of time.

11. The system for heating and/or ventilation and/or air-conditioning according to claim 10,
wherein the second terminal of the first winding of the first motor electrically connects to the second terminal of the second winding of the first motor;
wherein the second terminal of the second winding of the first motor electrically connects to the second terminal of the third winding of the first motor;
wherein the second terminal of the third winding of the first motor electrically connects to the second terminal of the fourth winding of the first motor;
wherein the second terminal of the first winding of the second motor electrically connects to the second terminal of the second winding of the second motor;
wherein the second terminal of the second winding of the second motor electrically connects to the second terminal of the third winding of the second motor; and
wherein the second terminal of the third winding of the second motor electrically connects to the second terminal of the fourth winding of the second motor.

12. The system for heating and/or ventilation and/or air-conditioning according to claim 10,
wherein the second terminal of the first winding of the first motor electrically connects to the first terminal of the second winding of the first motor;
wherein the second terminal of the second winding of the first motor electrically connects to the first terminal of the third winding of the first motor;
wherein the second terminal of the third winding of the first motor electrically connects to the first terminal of the fourth winding of the first motor;
wherein the second terminal of the fourth winding of the first motor electrically connects to the first terminal of the first winding of the first motor;
wherein the second terminal of the first winding of the second motor electrically connects to the first terminal of the second winding of the second motor;
wherein the second terminal of the second winding of the second motor electrically connects to the first terminal of the third winding of the second motor;

wherein the second terminal of the third winding of the second motor electrically connects to the first terminal of the fourth winding of the second motor; and wherein the second terminal of the fourth winding of the second motor electrically connects to the first terminal of the first winding of the second motor.

13. The system for heating and/or ventilation and/or air-conditioning according to claim 12, wherein the control assembly comprises a plurality of amplifiers;

wherein the controller is in operative communication with the driver circuit and in operative communication with the appliance; and wherein the driver circuit is in operative communication with the first motor and with the second motor.

14. The system for heating and/or ventilation and/or air-conditioning according to claim 10, the control assembly further configured to:

after the application of the second electric signal to the first terminal of the fourth winding of the first motor, apply the first electric signal to the first terminal of the fourth winding of the first motor for a fifteenth number of regular intervals of time; and after the application of the first electric signal to the first terminal of the fourth winding of the second motor, apply the second electric signal to the first terminal of the fourth winding of the second motor for a sixteenth number of regular intervals of time;

wherein the fifteenth number of regular intervals of time and the sixteenth number of regular intervals of time differ by at least one regular interval of time.

15. The system for heating and/or ventilation and/or air-conditioning according to claim 14, the control assembly further configured to:

after the application of the first electric signal to the first terminal of the fourth winding of the first motor for the fifteenth number of regular intervals of time, apply the second electric signal to the first terminal of the fourth winding of the first motor; and after the application of the second electric signal to the first terminal of the fourth winding of the second motor for the sixteenth number of regular intervals of time, apply the first electric signal to the first terminal of the fourth winding of the second motor.

* * * * *